(12) United States Patent
Motoishi et al.

(10) Patent No.: US 12,388,315 B2
(45) Date of Patent: Aug. 12, 2025

(54) ELECTRIC ROTATING MACHINE

(71) Applicant: Mitsubishi Electric Corporation, Tokyo (JP)

(72) Inventors: Naohiro Motoishi, Tokyo (JP); Fumitaka Totsuka, Tokyo (JP); Yosuke Sugino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 363 days.

(21) Appl. No.: 18/050,620

(22) Filed: Oct. 28, 2022

(65) Prior Publication Data

US 2023/0412030 A1 Dec. 21, 2023

(30) Foreign Application Priority Data

Jun. 15, 2022 (JP) .................. 2022-096249

(51) Int. Cl.
*H02K 3/52* (2006.01)
(52) U.S. Cl.
CPC ......... H02K 3/522 (2013.01); *H02K 2203/12* (2013.01)
(58) Field of Classification Search
CPC .................... H02K 3/522; H02K 2203/12
See application file for complete search history.

(56) References Cited

U.S. PATENT DOCUMENTS

| | | | | |
|---|---|---|---|---|
| 2004/0124733 A1* | 7/2004 | Yamamoto | .............. | B29C 70/72 29/596 |
| 2015/0048711 A1* | 2/2015 | Hino | ...................... | H02K 3/522 310/215 |

FOREIGN PATENT DOCUMENTS

| JP | 2011103712 A | * | 5/2011 | |
|---|---|---|---|---|
| JP | 2011200060 A | * | 10/2011 | |
| JP | 5061788 B2 | | 10/2012 | |
| JP | 5178935 B1 | | 4/2013 | |
| JP | 5234899 B2 | | 7/2013 | |
| JP | 5412880 B2 | | 2/2014 | |
| JP | 5452177 B2 | | 3/2014 | |
| JP | 5546373 B2 | | 7/2014 | |
| JP | 5709461 B2 | * | 4/2015 | |
| JP | 5874418 B2 | | 3/2016 | |
| JP | 6103559 B1 | * | 3/2017 | ............. H02K 3/345 |

OTHER PUBLICATIONS

English translation of JP-2011200060-A (Year: 2011).*
English translation of JP-6103559-B1 (Year: 2017).*
English translation of JP-2011103712-A (Year: 2011).*
English translation of JP-5709461-B2 (Year: 2015).*

* cited by examiner

*Primary Examiner* — Tulsidas C Patel
*Assistant Examiner* — Joshua Kiel M Rodriguez
(74) *Attorney, Agent, or Firm* — Sughrue Mion, PLLC

(57) ABSTRACT

An insulating bobbin to be mounted on a stator core has a tooth-endface facing portion that faces an endface portion, in an axial direction, of the tooth portion and a tooth-side-surface facing portion that faces a tooth side surface portion, in a circumferential direction, of the tooth portion; the tooth-side-surface facing portion has a first abutting area that abuts on the tooth side surface portion, a second abutting area that abuts on the tooth side surface portion at a more outer side in a radial direction than the first abutting area abuts thereon, and a middle inner wall surface portion that is situated between the first abutting area and the second abutting area and faces the tooth side surface portion via a space.

17 Claims, 14 Drawing Sheets

ELECTRIC ROTATING MACHINE

BACKGROUND OF THE INVENTION

Field of the Invention

The present disclosure relates to an electric rotating machine.

Description of the Related Art

As is well known, there exists an electric rotating machine that has a rotatable rotor and a stator disposed in such a way as to be spaced a gap apart from the outer circumference portion of the rotor and in which a stator coil is mounted on a stator core through the intermediary of an insulating bobbin.

To date, as the insulating bobbin in the foregoing electric rotating machine, there has been known an insulating bobbin including a first insulating bobbin and a second insulating bobbin that are fitted onto both respective axial-direction endfaces of the stator core along the axial direction (for example, refer to Patent Document 1).

PRIOR ART REFERENCE

Patent Document

[Patent Document 1] Japanese Patent No. 51789325

SUMMARY OF THE INVENTION

The foregoing conventional electric rotating machine is produced through a process in which after the first insulating bobbin and the second insulating bobbin are mounted on the stator core, the stator coil is wound around the stator core through the intermediary of the first insulating bobbin and the second insulating bobbin; however, there has been a problem that in the process where the stator coil is wound around the stator core, the stator coil applies excessive stress to the first insulating bobbin and the second insulating bobbin and hence cracks may be caused in the first insulating bobbin and the second insulating bobbin.

The present disclosure is to disclose a technology for solving the foregoing problem; the objective thereof is to provide an electric rotating machine that realizes enhancement of the reliability by preventing breakage such as a crack from being caused in the insulating bobbin at a time when the stator coil is wound.

An electric rotating machine disclosed in the present disclosure includes a rotor fixed on a pivotably supported rotor shaft and a stator containing the rotor; the electric rotating machine is characterized
　in that the stator has a stator core and a stator coil mounted on the stator core through the intermediary of an insulating bobbin,
　in that the stator core has a ring-shaped back yoke portion and a tooth portion whose front-end portion protrudes from the back yoke portion toward the rotor shaft,
　in that the insulating bobbin includes a first insulating bobbin and a second insulating bobbin that are fitted onto both respective endfaces of the stator core in an axial direction of the electric rotating machine,
　in that at least one of the first insulating bobbin and the second insulating bobbin has a coil winding portion around which a conductor wire included in the stator coil is wound and whose cross section is U-shaped,
　in that the coil winding portion has a tooth-endface facing portion that faces an endface portion, in the axial direction, of the tooth portion and a tooth-side-surface facing portion that faces a tooth side surface portion, in a circumferential direction of the electric rotating machine, of the tooth portion, and
　in that the tooth-side-surface facing portion has a first abutting area that abuts on the tooth side surface portion, a second abutting area that abuts on the tooth side surface portion at a more outer side in a radial direction of the electric rotating machine than the first abutting area abuts thereon, and a middle inner wall surface portion that is situated between the first abutting area and the second abutting area and faces the tooth side surface portion via a space.

In addition, an electric rotating machine disclosed in the present disclosure includes a rotor fixed on a pivotably supported rotor shaft and a stator containing the rotor; the electric rotating machine is characterized
　in that the stator has a stator core and a stator coil mounted on the stator core through the intermediary of an insulating bobbin,
　in that the stator core has a ring-shaped back yoke portion and a tooth portion whose front-end portion protrudes from the back yoke portion toward the rotor shaft,
　in that at the front-end portion of the tooth portion, the stator core has a shoe portion that extends in the circumferential direction of the electric rotating machine from the tooth side surface portion in the circumferential direction of the electric rotating machine,
　in that the insulating bobbin includes a first insulating bobbin and a second insulating bobbin that are fitted onto both respective endfaces of the stator core in an axial direction of the electric rotating machine,
　in that at least one of the first insulating bobbin and the second insulating bobbin has a coil winding portion around which a conductor wire included in the stator coil is wound and whose cross section is U-shaped,
　in that the coil winding portion has a tooth-endface facing portion that faces an endface portion, in the axial direction, of the tooth portion, a tooth-side-surface facing portion that faces a tooth side surface portion, and a shoe-side-surface facing inner wall surface portion that faces a shoe side-surface portion, in the circumferential direction, of the shoe portion,
　in that the shoe-side-surface facing inner wall surface portion has a first abutting area that abuts on the shoe side-surface portion, and
　in that the tooth-side-surface facing portion has a second abutting area that abuts on the tooth side surface portion and a middle inner wall surface portion that is situated between the first abutting area and the second abutting area and faces the tooth side surface portion via a space.

The present disclosure makes it possible to obtain an electric rotating machine that realizes enhancement of the reliability by preventing breakage such as a crack from being caused in an insulating bobbin at a time when the stator coil is wound.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Figure 1:
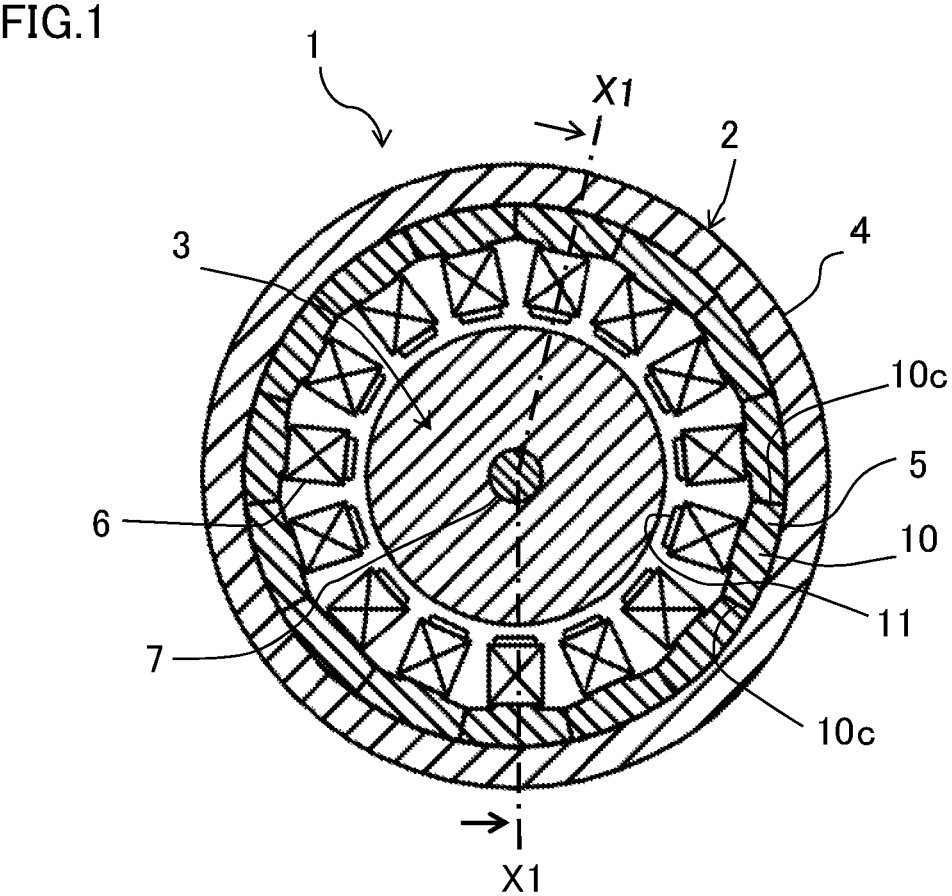
FIG. 1 is a cross-sectional view of an electric rotating machine according to Embodiment 1, taken along a plane perpendicular to the center axis.

Hereinafter, two or more embodiments of the present disclosure and two of more comparative examples for the present disclosure will be explained; the same reference characters denote the same or similar portions. In addition, in the following explanations, the terms "radial direction", "circumferential direction", "axial direction", "outer radial side", and "inner radial side", or the others similar to those are defined with reference to an electric rotating machine at a time when the members to be explained are mounted in the electric rotating machine.

Embodiment 1

Figure 2:
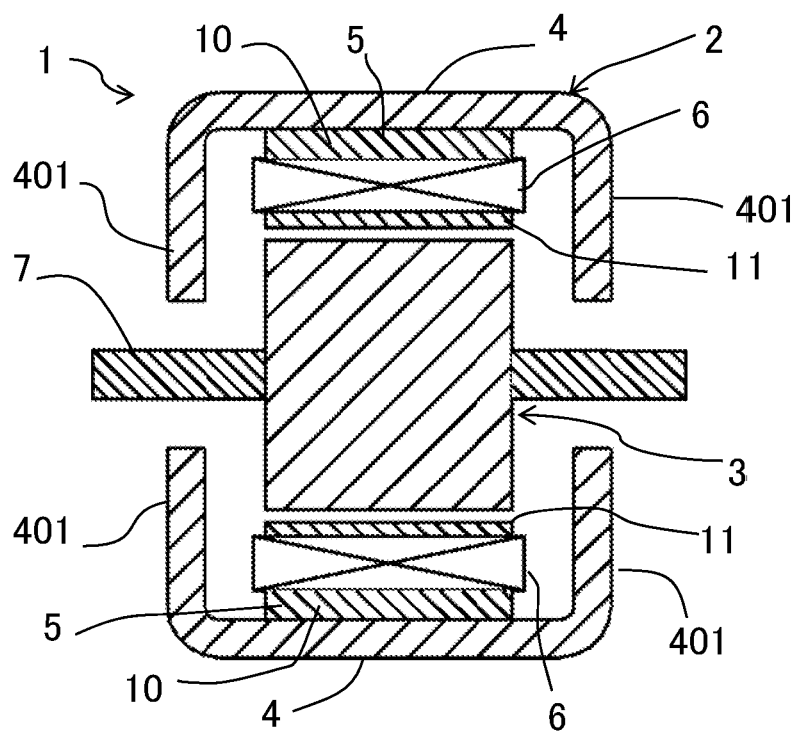
FIG. 2 is a cross-sectional view of the electric rotating machine according to Embodiment 1, when viewed in the direction of the arrow along the line X1-X1 in FIG. 1.

An electric rotating machine according to Embodiment 1 will be explained with reference to the drawings. FIG. 1 is a cross-sectional view of an electric rotating machine according to Embodiment 1, taken along a plane perpendicular to the center axis; FIG. 2 is a cross-sectional view of the electric rotating machine according to Embodiment 1, when viewed in the direction of the arrow along the line X1-X1 in FIG. 1. In each of FIGS. 1 and 2, an electric rotating machine 1 has a stator 2 and a rotor 3 inserted into the inner space of the stator 2.

The stator 2 includes a cylindrical tubular frame 4 having respective end wall portions 401 at the both axial-direction end portions, two or more identically shaped stator cores 5 that are fixed to the inner wall surface of the frame 4, and two or more stator coils 6 wound around respective tooth portions 11 of the stator cores 5 through the intermediary of after-mentioned first insulating bobbin and second insulating bobbin. Each of the stator core 5 is formed of two or more magnetic steel plates stacked in the axial direction of the electric rotating machine 1.

The identically shaped stator cores 5 are aligned in a ring-shaped manner in such a way as to abut on one another at respective adjacent back-yoke side surface portions 10c of back yoke portions 10 in the neighboring stator cores 5 and are fixed to the inner circumference portion of the frame 4. The two or more stator coils 6 wound around the respective tooth portions 11 of the stator cores are arranged in such a way as to be spaced evenly apart from each other in the circumferential direction of the electric rotating machine 1. The respective stator coils 6 are connected with each other, for example, at one of or both of the axial-direction end portions of the stator 2 so as to form a concentrated-winding three-phase stator coil.

The rotor 3 has two or more magnetic-field poles (unillustrated) including permanent magnets fixed to the rotor core and is fixed to a rotor shaft 7. The rotor shaft 7 is pivotably supported by a pair of bearings (unillustrated) fixed to a pair of side wall portions 401 of the frame 4.

In the case where the electric rotating machine 1 operates as a motor, torque is produced in the rotor 3 based on the interaction between rotating magnetic flux generated by applying an electric current to the stator coil 6 and magnetic flux generated by the magnetic-field pole, so that the rotor 3 rotates along with the rotor shaft 7. In the case where the electric rotating machine 1 operates as a power generator, the rotor 3 rotates by being driven, for example, by an internal combustion engine, and magnetic flux generated by the magnetic-field pole is interlinked with the stator coil 6; thus, a voltage is induced in the stator coil 6 and hence electric power based on the voltage is outputted.

Figure 3:
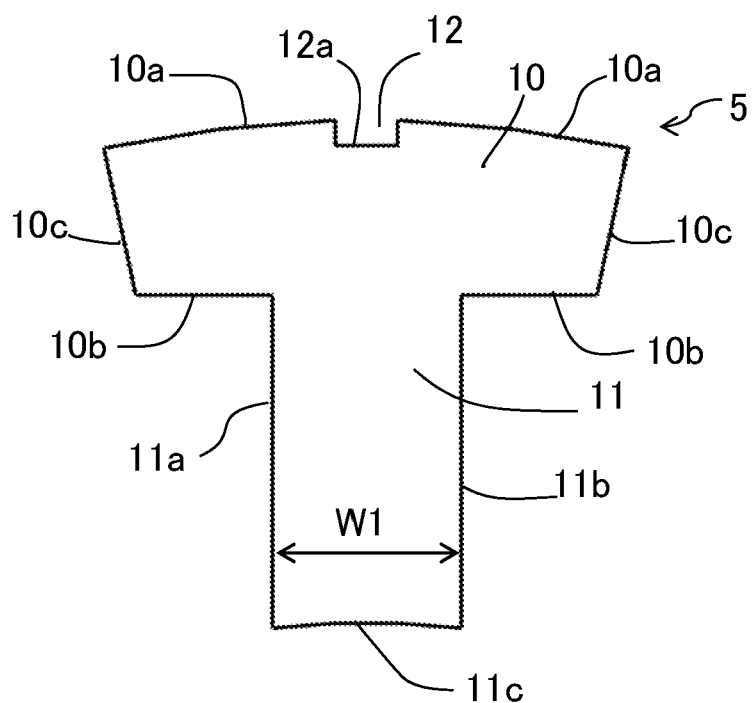
FIG. 3 is a plan view illustrating the principal part of a stator core in the electric rotating machine according to Embodiment 1.

FIG. 3 is a plan view illustrating the principal part of the stator core in the electric rotating machine according to Embodiment 1. In FIG. 3, the stator core 5 has the back yoke portion 10 and the tooth portion 11. The back yoke portion 10 has a back-yoke outer circumferential portion 10a formed in the shape of an arc, a back-yoke inner circumference portion 10b, and a pair of back-yoke side surface portions 10c that are each connected with the back-yoke outer circumferential portion 10a and the back-yoke inner circumference portion 10b. A back-yoke cutout portion 12 is provided in the back-yoke outer circumferential portion 10a.

The tooth portion 11 extends from the back-yoke inner circumference portion 10b of the back yoke portion 10 toward the center axis line of the electric rotating machine 1 and has a pair of tooth side surface portions 11a and 11b and a tooth front-end portion 11c that faces the circumference surface portion of the rotor 3 through an air gap. The tooth portion 11 is formed in such a way that the width W1 thereof is 1 [mm]. It may be allowed that a shoe portion is provided in the tooth front-end portion 11c.

As described later, the stator coil 6 is wound around the tooth portion 11 of the stator core 5 through the intermediary of the first insulating bobbin disposed on one stacking-direction core endface portion of the two or more electromagnetic steel plates, which are included in the stator core 5, and the second insulating bobbin disposed on the other stacking-direction core endface portion of the electromagnetic steel plates.

Figure 4:
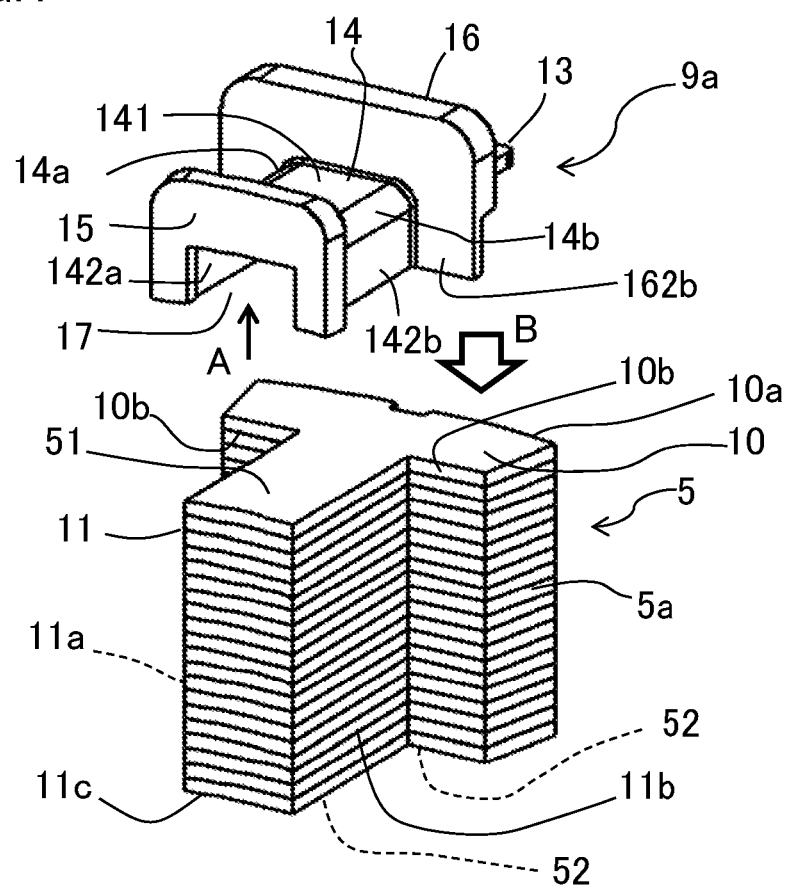
FIG. 4 is a perspective view illustrating the stator core and a first insulating bobbin to be mounted on the stator core in the electric rotating machine according to Embodiment 1.
Figure 5:
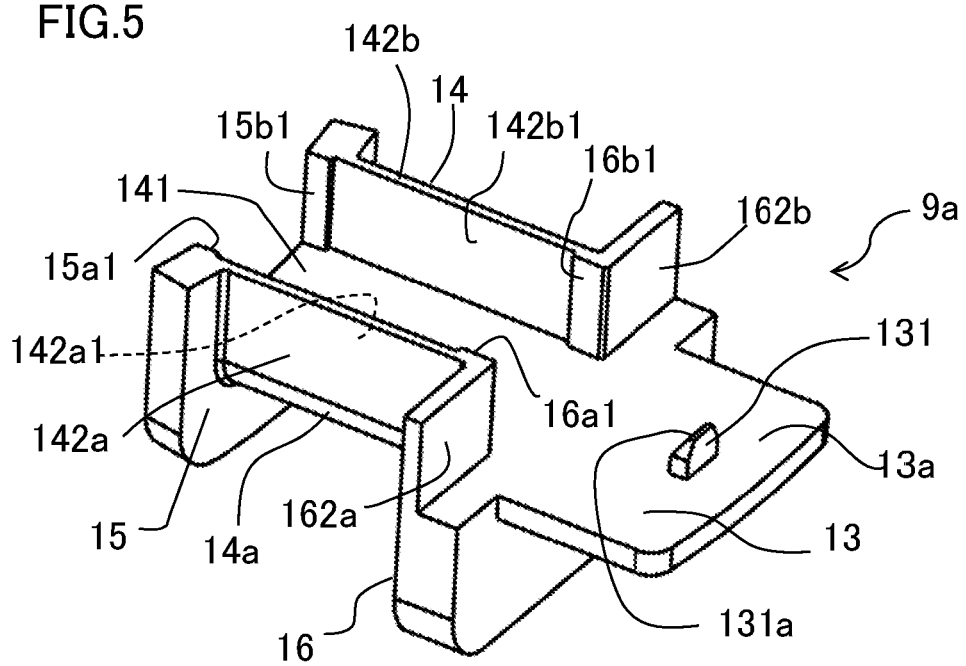
FIG. 5 is a perspective view of the first insulating bobbin in the electric rotating machine according to Embodiment 1, when viewed in the direction of the arrow A in FIG. 4.
Figure 6:
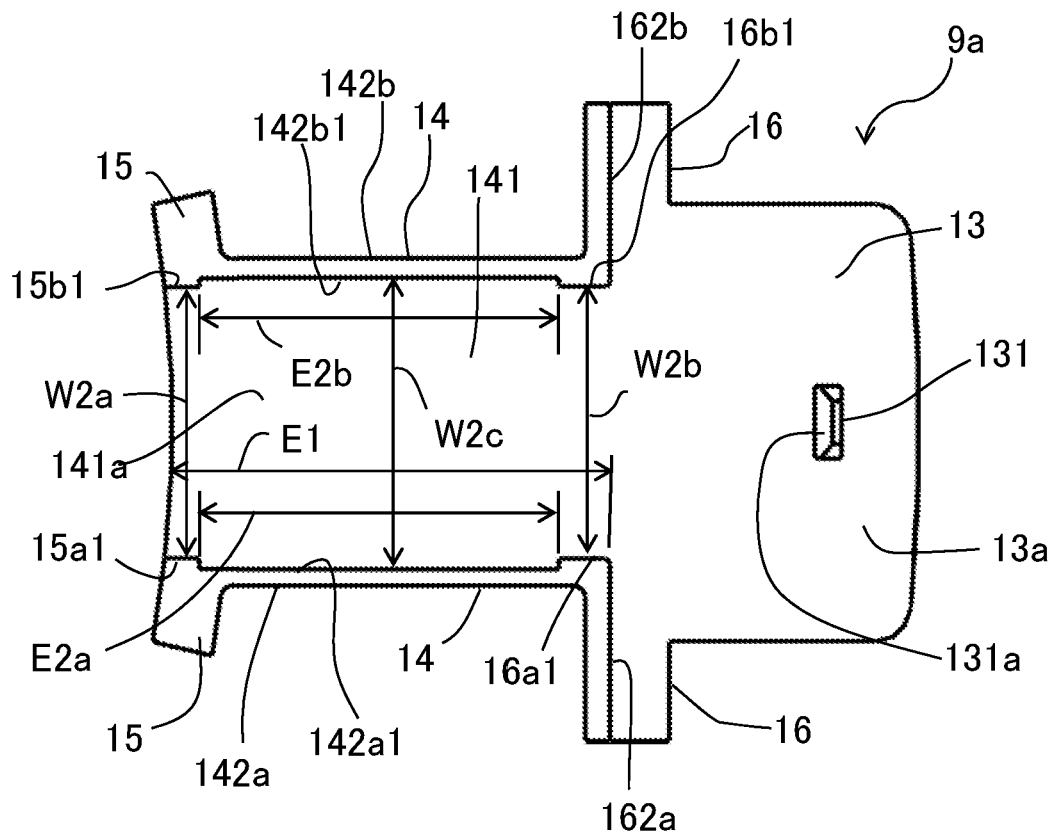
FIG. 6 is a front view of the first insulating bobbin in the electric rotating machine according to Embodiment 1, when viewed in the direction of the arrow A in FIG. 4.

FIG. 4 is a perspective view illustrating the stator core and the first insulating bobbin to be mounted on the stator core in the electric rotating machine according to Embodiment 1; FIG. 5 is a perspective view of the first insulating bobbin in the electric rotating machine according to Embodiment 1, when viewed in the direction of the arrow A in FIG. 4; FIG. 6 is a front view of the first insulating bobbin in the electric rotating machine according to Embodiment 1, when viewed in the direction of the arrow A in FIG. 4.

In FIG. 4, a first insulating bobbin 9a is mounted on the tooth portion 11 around which a copper wire, as a conductor wire, in the stator core 5 is wound. More specifically, an insulating-bobbin opening portion 17 of the first insulating bobbin 9a is fitted onto the tooth portion 11 in the direction of the arrow B from the side of one stacking-direction core endface portion 51 of the electromagnetic steel plates 5a in the stator core 5, so that the first insulating bobbin 9a is mounted on the tooth portion 11.

Although not illustrated in FIG. 4, an after-mentioned second insulating bobbin 9b having a configuration the same as that of the first insulating bobbin 9a is mounted on the tooth portion 11 around which a copper wire in the stator core 5 is wound. More specifically, an insulating-bobbin opening portion of the second insulating bobbin 9b is fitted onto the tooth portion 11 in the direction opposite to the arrow B from the side of the other stacking-direction core endface portion 52 of the electromagnetic steel plates 5a in the stator core 5, so that the second insulating bobbin 9b is mounted on the tooth portion 11. In such a way as described above, the first insulating bobbin 9a is mounted on the tooth portion 11 of the stator core 5 in such a way as to cover the one core endface portion 51; the second insulating bobbin 9b is mounted on the tooth portion 11 of the stator core 5 in such a way as to cover the other core endface portion 52.

In each of FIGS. 4, 5, and 6, the first insulating bobbin 9a has a back-yoke-endface facing portion 13 that faces one stacking-direction endface portion of the back yoke portion 10 of the stator core 5, a tooth-endface facing portion 141 that is integrally coupled with the back-yoke-endface facing portion 13 and faces one stacking-direction endface of the tooth portion 11, a tooth-side-surface facing portion 142a that faces the tooth side surface portion 11a, and a tooth-side-surface facing portion 142b that faces tooth side surface portion 11b. The tooth-endface facing portion 141 and the tooth-side-face facing portions 142a and 142b form a coil winding portion 14 around which a copper wire included in the stator coil 6 is wound and whose cross section is U-shaped.

In addition, the first insulating bobbin 9a has a first flange portion 15 that is formed on one end portion of the outer surface portion of the coil winding portion 14 and prevents the stator coil 6 from running off the edge of the coil winding portion 14 and a second flange portion 16 that is formed on the other end portion of the outer surface portion of the coil winding portion 14 and prevents the stator coil 6 from running off the edge of the coil winding portion 14.

As illustrated in FIG. 4, at the anti-stator-core 5 side of the first insulating bobbin 9a, the first flange portion 15, the outer surface portion of the coil winding portion 14, the second flange portion 16, and the surface portion, at the anti-back-yoke-portion 10 side, of the back-yoke-endface facing portion 13 are exposed. Fillet surfaces 14a and 14b are formed in the outer surface portion of the coil winding portion 14.

In addition, as illustrated in FIG. 6, at the inside of the first insulating bobbin 9a, which is the stator core 5 side, a tooth-endface facing surface portion 141a that faces the tooth portion 11 of the stator core 5 and has an area E1 and a back-yoke-endface facing surface portion 13a that faces the back yoke portion 10 of the stator core 5 are exposed. The back-yoke-endface facing portion 13 has a convex portion 131 that protrudes from the back-yoke-endface facing surface portion 13a facing the back yoke portion 10 of the stator core 5 toward the back yoke portion 10.

The back-yoke-endface facing portion 13, the coil winding portion 14, the first flange portion 15, and the second flange portion 16 are formed by integrally molding an insulator such as a synthetic resin. When the first insulating bobbin 9a is mounted on the tooth portion 11, the first flange portion 15 is situated at the radial-direction inner side of the electric rotating machine 1, and the second flange portion 16 is situated at the radial-direction outer side of the electric rotating machine 1.

Back-yoke-inner-circumference facing portions 162a and 162b that face the back-yoke inner circumference portion 10b of the stator core 5 are formed in the second flange portion 16. The thickness dimension of each of the back-yoke-inner-circumference facing portions 162a and 162b is set to be smaller than the thickness dimension of the second flange portion 16. Each of the back-yoke-inner-circumference facing portions 162a and 162b is formed in such a way as to vertically protrude from the back-yoke-endface facing surface portion 13a of the back-yoke-endface facing portion 13.

When the first insulating bobbin 9a is mounted on the tooth portion 11 of the stator core 5 from the one core endface portion 51 side of the stator core 5, a side-surface portion 131a of the convex portion 131 in the first insulating bobbin 9a is pressed against a side-surface portion 12a of the back-yoke cutout portion 12 in the stator core 5, and the back-yoke-inner-circumference facing portions 162a and 162b of the first insulating bobbin 9a are pressed against the back-yoke inner circumference portion 10b of the stator core 5.

The foregoing area E1, inside the first insulating bobbin 9a, that faces the tooth portion 11 of the stator core 5 includes a tooth-endface facing surface portion 141a that faces the one core endface portion 51 of the tooth portion 11, a middle inner wall surface portion 142a1 facing the tooth side surface portion 11a, and a middle inner wall surface portion 142b1 facing the tooth side surface portion 11b.

An inner-wall-surface convex portion 15a1, as a first abutting area, and an inner-wall-surface convex portion 16a1, as a second abutting area, are formed adjacent to the respective end edges of the middle inner wall surface portion 142a1. Moreover, an inner-wall-surface convex portion 15b1, as a first abutting area, and an inner-wall-surface convex portion 16b1, as a second abutting area, are formed adjacent to the respective end edges of the middle inner wall surface portion 142b1. A distance W2a [mm] between the inner-wall-surface convex portions 15a1 and 15b1 that face each other and a distance W2b [mm] between the inner-wall-surface convex portions 16a1 and 16b1 that face each other are set to one and the same dimension.

The foregoing middle inner wall surface portion 142a1 is formed in an area E2a between the inner-wall-surface convex portion 15a1 and the inner-wall-surface convex portion 16a1; the foregoing middle inner wall surface portion 142b1 is formed in an area E2b between the inner-wall-surface convex portion 15b1 and the inner-wall-surface convex portion 16b1. These middle inner wall surface portions 142a1 and 142b1 face each other across a distance W2c [mm].

The distance W2a [mm] between the inner-wall-surface convex portions 15a1 and 15b1 that face each other, the distance W2b [mm] between the inner-wall-surface convex portions 16a1 and 16b1 that face each other, the distance W2c [mm] between the middle inner wall surface portions 142a1 and 142b1 that face each other, the width W1 [mm] of the tooth portion 11 of the stator core 5 have the following relationships among them.

W2a=W2b
W2c>(W2a, W2b)
W1≤(W2a, W2b)

In addition, the second insulating bobbin 9b has a configuration the same as that of the first insulating bobbin 9a; thus, the explanation therefor will be omitted.

Figure 7:
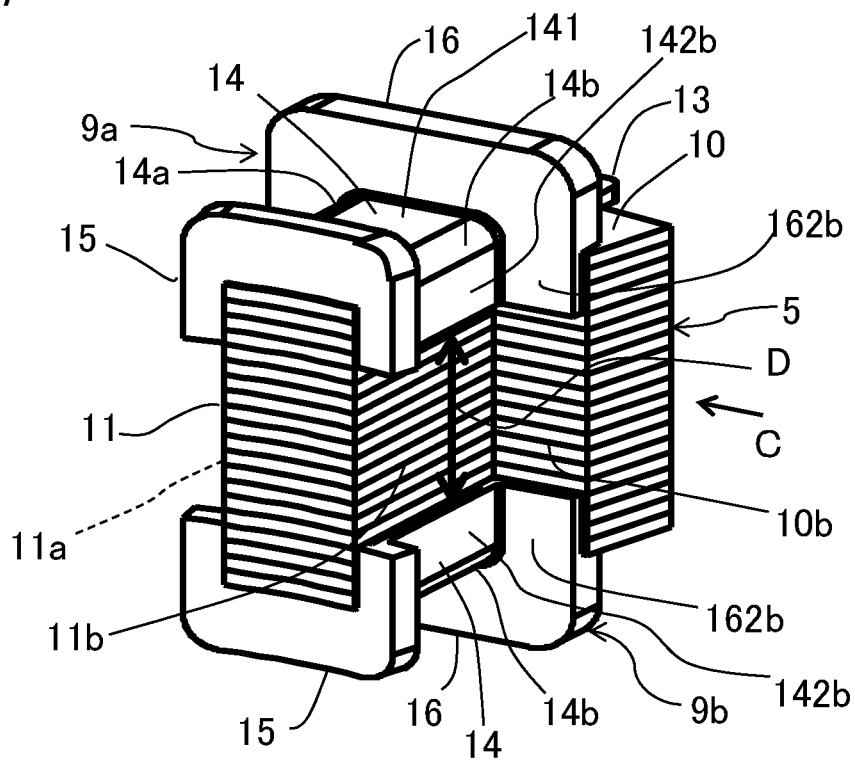
FIG. 7 is a perspective view illustrating the first insulating bobbin and a second insulating bobbin mounted on the stator core in the electric rotating machine according to Embodiment 1.
Figure 8:
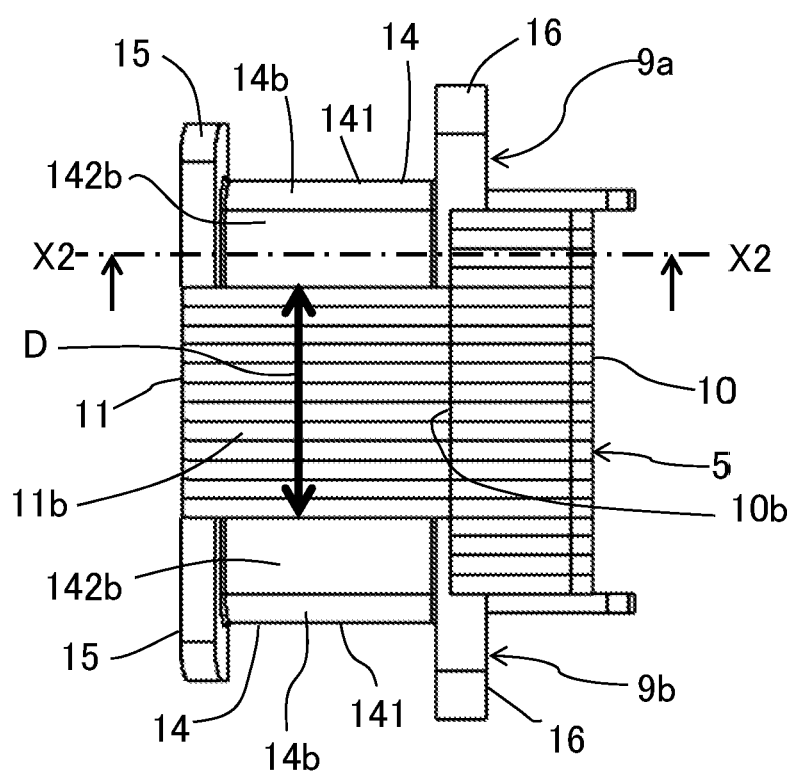
FIG. 8 is a side view illustrating the first insulating bobbin and the second insulating bobbin mounted on the stator core in the electric rotating machine according to Embodiment 1, when viewed from the direction of the arrow C in FIG. 7.
Figure 9:
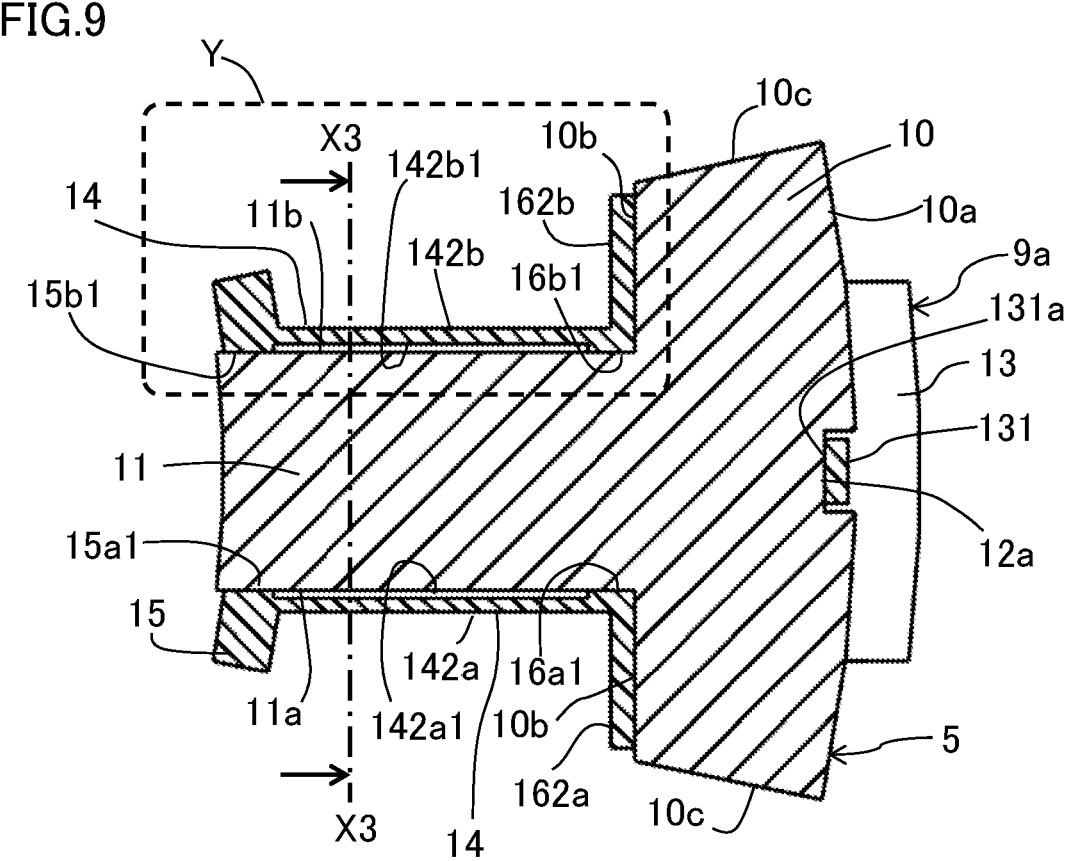
FIG. 9 is a cross-sectional view of the first insulating bobbin mounted on the stator core in the electric rotating machine according to Embodiment 1, when viewed in the direction of the arrow along the line X2-X2 in FIG. 8.
Figure 10:
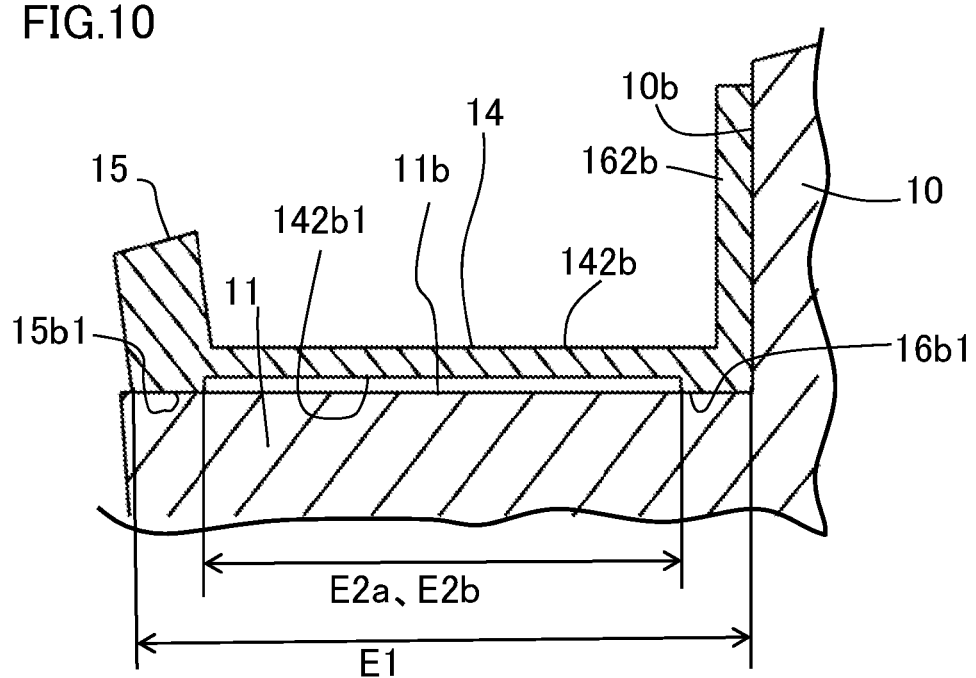
FIG. 10 is an enlarged view of the part Y in FIG. 9.

FIG. 7 is a perspective view illustrating the first insulating bobbin and the second insulating bobbin mounted on the stator core in the electric rotating machine according to Embodiment 1; FIG. 8 is a side view illustrating the first insulating bobbin and the second insulating bobbin mounted on the stator core in the electric rotating machine according to Embodiment 1, when viewed from the direction of the arrow C in FIG. 7. Each of FIGS. 7 and 8 illustrates a state where the first insulating bobbin 9a is mounted on the stator core 5 along the direction of the arrow B in FIG. 4 and the second insulating bobbin 9b is mounted on the stator core 5 in the direction opposite to the arrow B. FIG. 9 is a cross-sectional view of the first insulating bobbin mounted on the stator core in the electric rotating machine according to Embodiment 1, when viewed in the direction of the arrow along the line X2-X2 in FIG. 8; FIG. 10 is an enlarged view of the part Y in FIG. 9.

In FIGS. 7, 8, 9, and 10, the first insulating bobbin 9a and the second insulating bobbin 9b are mounted onto the stator core 5 from the respective core endface portions 51 and 52, respectively, of the stator core 5. In this situation, the back-yoke-inner-circumference facing portions 162a and 162b in each of the first insulating bobbin 9a and the second insulating bobbin 9b abut on the back-yoke inner circumference portion 10b, and the side-surface portion 131a of the convex portion 131 provided in the back-yoke-endface facing portion 13 abuts on the side-surface portion 12a of the back-yoke cutout portion 12 provided in the back-yoke outer circumferential portion 10a.

The side-surface portion 131a of the convex portion 131 has a slant surface; because when the first insulating bobbin 9a and the second insulating bobbin 9b are mounted on the stator core 5, the side-surface portion 131a of the convex portion 131 is pressed against the side-surface portion 12a of the back-yoke cutout portion 12 in the back yoke portion 10, the first insulating bobbin 9a and the second insulating bobbin 9b are securely fixed to the stator core 5.

In addition, as illustrated in FIG. 8, the tooth side surface portions 11a and 11b and the back-yoke inner circumference portion 10b are exposed in the range indicated by the arrow D in the stacking direction of the stator core 5; however, it may be allowed that in order to secure the electrical insulation between the stator core 5 and the stator coil 6, the first insulating bobbin 9a and the second insulating bobbin 9b are extended in the stacking direction of the tooth portion 11 in comparison with the case illustrated in FIG. 7 so that the tooth side surface portions 11a and 11b are completely covered. Alternatively, it may be allowed that an insulation sheet is pasted on the exposed part of the tooth side surface portions 11a and 11b and the back-yoke inner circumference portion 10b.

As described above, in the area E1 in the inside of each of the first insulating bobbin 9a and the second insulating bobbin 9b in the electric rotating machine according to Embodiment 1, the inner-wall-surface convex portion 15a1 and the inner-wall-surface convex portion 16a1 are provided adjacent to the respective sides of the middle inner wall surface portion 142a1, and the inner-wall-surface convex portion 15b1 and the inner-wall-surface convex portion 16b1 are provided adjacent to the respective sides of the middle inner wall surface portion 142b1; each of the innerwall-surface convex portions 15a1, 16a1, 15b1, and 16b1 is formed in the shape of a protruding body extending in the stacking direction of the tooth portion 11.

The middle inner wall surface portion 142a1 inserted between the inner-wall-surface convex portions 15a1 and 16a1 is formed as a flat surface portion recessed from the respective top surface portions of the inner-wall-surface convex portions 15a1 and 16a1. Similarly, the middle inner wall surface portion 142b1 inserted between the inner-wall-surface convex portions 15b1 and 16b1 is formed as a flat surface portion recessed from the respective top surface portions of the inner-wall-surface convex portions 15b1 and 16b1.

Accordingly, when the first insulating bobbin 9a and the second insulating bobbin 9b are mounted on the stator core, the tooth side surface portion 11a abuts on the inner-wall-surface convex portions 15a1 and the 16a1, and the tooth side surface portion 11b abuts on the inner-wall-surface convex portions 15b1 and the 16b1; in the area E2a indicated in FIG. 6, a space portion is formed between the middle inner wall surface portion 142a1 and the tooth side surface portion 11a, and in the area E2b, a space portion is formed between the middle inner wall surface portion 142b1 and the tooth side surface portion 11b.

Next, in order to make the features of the electric rotating machine according to Embodiment 1 clearer, respective electric rotating machines according to comparative examples will be explained.

Comparative Example 1

Figure 11:
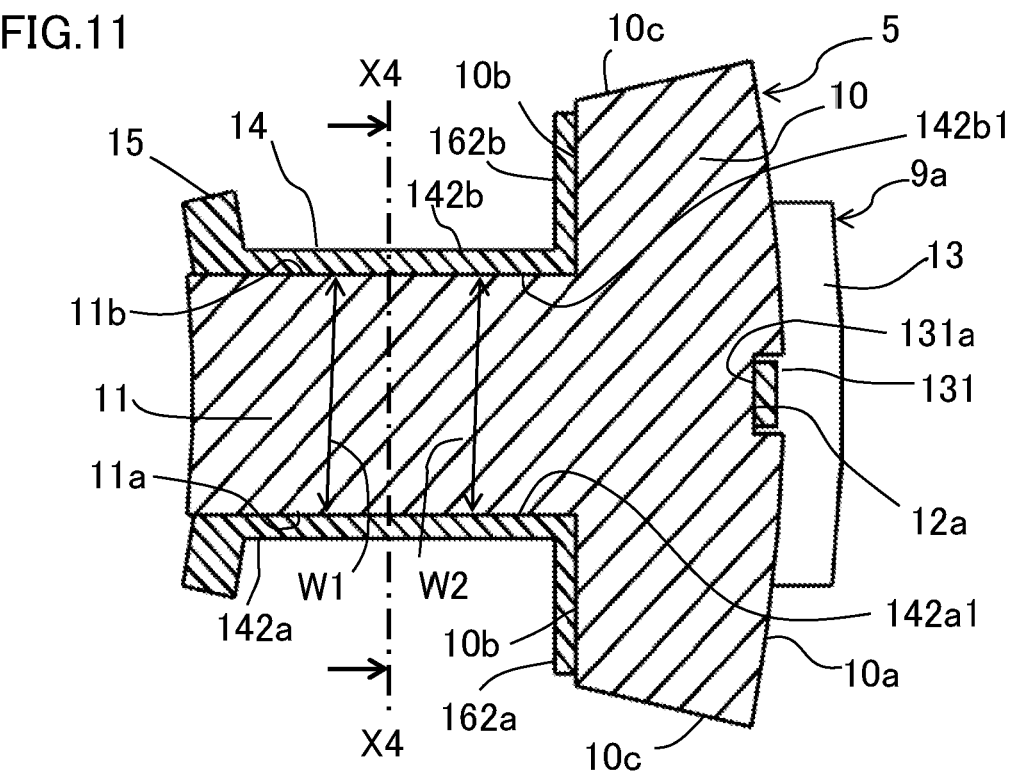
FIG. 11 is a cross-sectional view of a first insulating bobbin mounted on a stator core in an electric rotating machine according to Comparative Example 1.

FIG. 11 is a cross-sectional view of the first insulating bobbin mounted on a stator core in an electric rotating machine according to Comparative Example 1; the constituent elements the same as or similar to those of the electric rotating machine according to Embodiment 1 of the present disclosure are designated by reference characters the same as those therein. In FIG. 11, the first insulating bobbin 9a according to Comparative Example 1 does not have the foregoing inner-wall-surface convex portions and the foregoing middle inner wall surface portions provided in the first insulating bobbin 9a in the electric rotating machine according to Embodiment 1 of the present disclosure.

The other configurations are the same as those in the electric rotating machine according to Embodiment 1. The following explanation for Comparative Example 1 will be made by use of the first insulating bobbin 9a; however, the same explanation can be applied also to the second insulating bobbin (unillustrated).

In general, because each of materials or components to be produced definitely has dimensional tolerance, it is not made possible to make the width W1 of the tooth portion 11 of the stator core 5 completely coincide with the distance W2 between the tooth-side-surface facing portions 142a and 142b, of the first insulating bobbin 9a, that face the tooth side surface portions 11a and 11b, respectively (the equation [W1=W2] cannot be established); therefore, neither the gap between the tooth side surface portion 11a and the tooth-side-surface facing portion 142a nor the gap between the tooth side surface portion 11b and the tooth-side-surface facing portion 142b can be made "0".

In the case where W1>W2, the first insulating bobbin 9a is mounted on the tooth portion 11 through press-fitting; in the case where W1<W2, the first insulating bobbin 9a is mounted on the tooth portion 11 with a gap. FIG. 11 illustrates the case where in the first insulating bobbin 9a according to Comparative Example 1, the inner wall surface portion of each of the tooth-side-surface facing portions 142a and 142b has neither a depression nor a protrusion and where the equation [W1>W2] is established.

Figure 13:
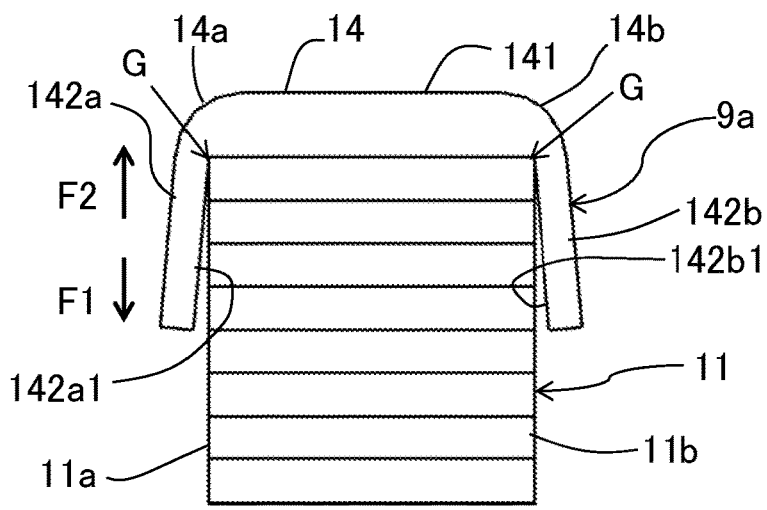
FIG. 13 is a cross-sectional view of the first insulating bobbin mounted on the stator core in the electric rotating machine according to Comparative Example 1, when viewed in the direction of the arrow along the line X4-X4 in FIG. 11.

FIG. 13 is a cross-sectional view of the first insulating bobbin mounted on the stator core in the electric rotating machine according to Comparative Example 1, when viewed in the direction of the arrow along the line X4-X4 in FIG. 11. In FIG. 13, it is assumed that the direction indicated by the arrow F1 is the front end side of each of the tooth-side-surface facing portions 142a and 142b and that the direction indicated by the arrow F2 is the root side of each of the tooth-side-surface facing portions 142a and 142b; when the first insulating bobbin 9a is mounted on the tooth portion 11 through press-fitting, the middle inner wall surface portions 142a1 and 142b1 of the tooth-side-surface facing portions 142a and 142b, respectively, make contact with the respective corner portions of the tooth portion 11 at respective corner portions G where the respective root sides, indicated by the arrow F2, of the tooth-side-surface facing portions 142a and 142b and the tooth-endface facing portion 141 intersect each other.

Accordingly, when beginning from the respective corner portions G, the first insulating bobbin 9a is bent and deformed in the direction in which the front end sides, indicated by the arrow F1, of the tooth-side-surface facing portions 142a and 142b depart from the tooth side surface portions 11a and 11b, respectively; thus, at the respective corner portions G, large tensile stresses are applied to the root sides, indicated by the arrow F2, of the tooth-side-surface facing portions 142a and 142b.

Moreover, because when the coil is wound, a circumferential-direction load is applied to the respective outer side surfaces of the fillet surfaces 14a and 14b of the coil winding portion 14 and the tooth-side-surface facing portions 142a and 142b, the amount of deformation of the first insulating bobbin 9a increases and hence the tensile stress on the first insulating bobbin 9a increases. Accordingly, because in the coil winding portion 14, especially in the portion around the center thereof, there exists neither the first flange portion 15 nor the second flange portion 16 and hence the rigidity thereof is low, cracks may occur in the respective root portions, indicated by the arrow F2, of the tooth-side-surface facing portions 142a and 142b.

Comparative Example 2

Figure 12:
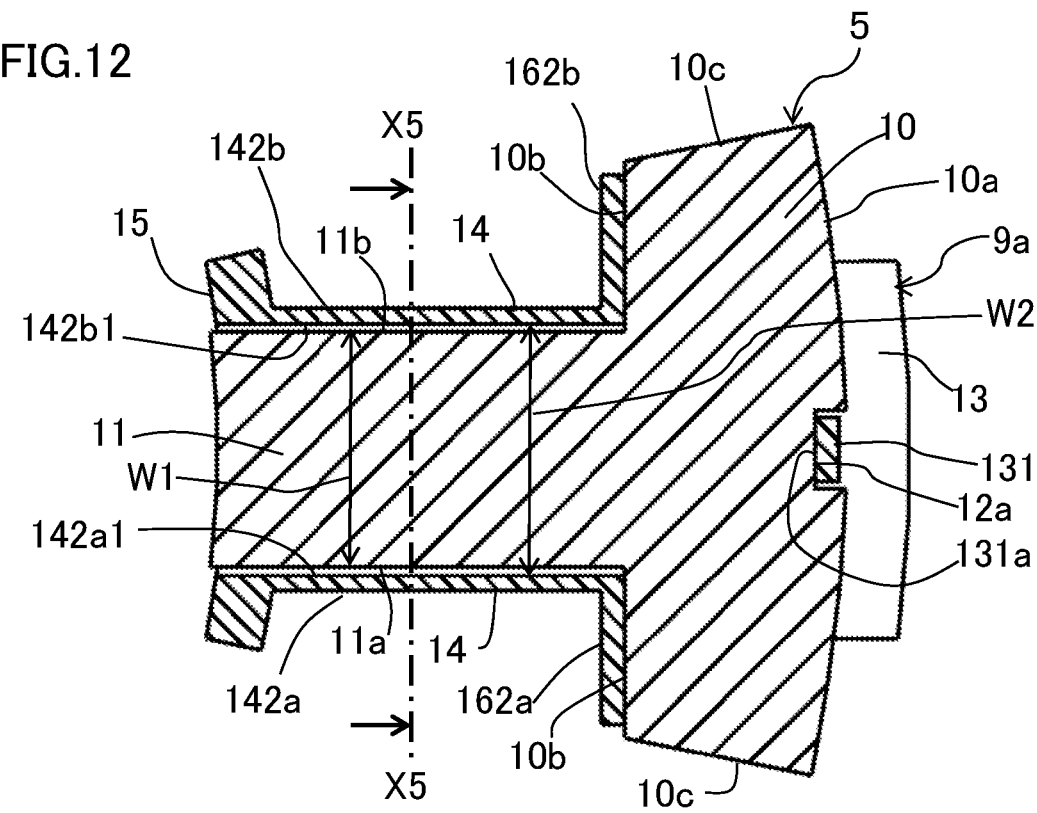
FIG. 12 is a cross-sectional view of a first insulating bobbin mounted on a stator core in an electric rotating machine according to Comparative Example 2.

FIG. 12 is a cross-sectional view of a first insulating bobbin mounted on a stator core in an electric rotating machine according to Comparative Example 2. In the first insulating bobbin 9a according to Comparative Example 2, each of the middle inner wall surface portions 142a1 and 142b1 of the tooth-side-surface facing portions 142a and 142b, respectively, has neither a depression nor a protrusion and the equation [W1<W2] is established. The other configurations are the same as those in Comparative Example 1.

Figure 14A:
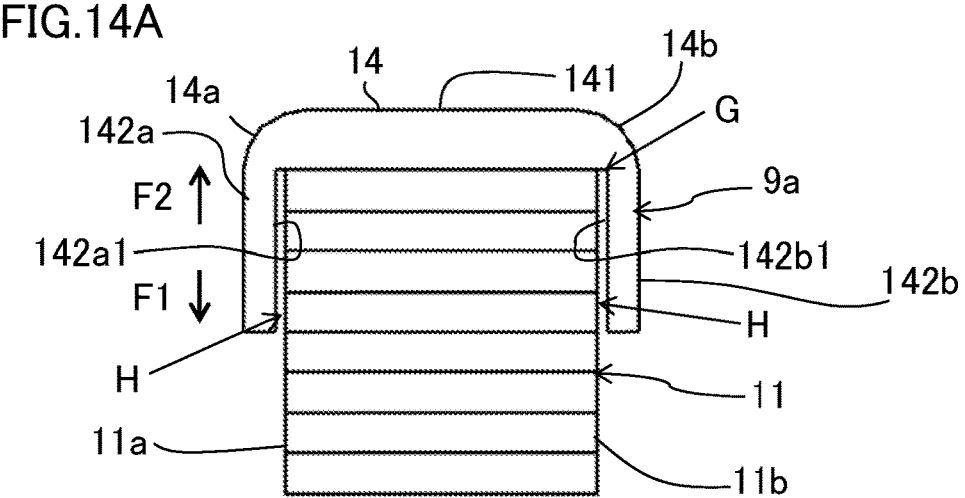
FIG. 14A is a cross-sectional view of the first insulating bobbin mounted on the stator core in the electric rotating machine according to Comparative Example 2, when viewed in the direction of the arrow along the line X5-X5 in FIG. 12.
Figure 14B:
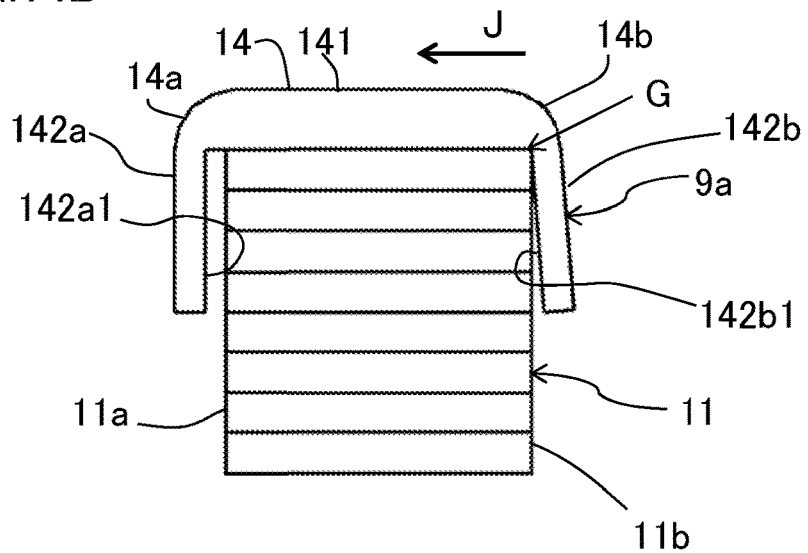
FIG. 14B is a cross-sectional view of the first insulating bobbin mounted on the stator core in the electric rotating machine according to Comparative Example 2, when viewed in the direction of the arrow along the line X5-X5 in FIG. 12.

Each of FIGS. 14A and 14B is a cross-sectional view of the first insulating bobbin mounted on the stator core in the electric rotating machine according to Comparative Example 2, when viewed in the direction of the arrow along the line X5-X5 in FIG. 12. In the case of Comparative Example 2, the first insulating bobbin 9a is mounted on the tooth portion 11 in such a way that there exists gaps between the tooth side surface portions 11a and 11b and the middle inner wall surface portions 142a1 and 142b1 of the tooth-side-surface facing portions 142a and 142b, respectively. Accordingly, as illustrated in FIG. 14A, when the first insulating bobbin 9a is mounted on the tooth portion 11, the root sides, indicated by the arrow F2, of the tooth-side-surface facing portions 142a and 142b do not make contact with the tooth side surface portions 11a and 11b, respectively; thus, no tensile stress is applied to each of the corner portions G.

However, because there exists a circumferential-direction clearance H between the tooth side surface portions 11a and 11b and the middle inner wall surface portions 142a1 and 142b1 of the tooth-side-surface facing portions 142a and 142b, respectively, and neither the middle inner wall surface portion 142a1 has the foregoing inner-wall-surface convex portion 15a1 and 16a1 nor the middle inner wall surface portion 142b1 has the foregoing inner-wall-surface convex portion 15b1 and 16b1, a circumferential-direction load is applied to the respective outer side surfaces of the fillet surfaces 14a and 14b of the first insulating bobbin 9a and the tooth-side-surface facing portions 142a and 142b at a time when the coil is wound.

Accordingly, for example, as illustrated in FIG. 14B, the coil winding portion 14 collectively shifts in the circumferential direction indicated by the arrow J and hence the inner wall surface of the coil winding portion 14 makes contact with the tooth side surface portion 11b at the corner portion G where the root side of the tooth-side-surface facing portion 142b and the tooth-endface facing portion 141 intersect each other; as a result, begins from the root portion of the tooth-side-surface facing portion 142b, the front-end portion of the tooth-side-surface facing portion 142b is bent and deformed in the direction departing from the tooth side surface portion 11b.

Therefore, a large tensile stress is applied to the corner portion G of the coil winding portion 14, and hence a crack may occur in the root portion of the tooth-side-surface facing portion 142b, because in the coil winding portion 14, especially in the portion around the center thereof, there exists neither the first flange portion 15 nor the second flange portion 16 and hence the rigidity thereof is low.

Figure 15A:
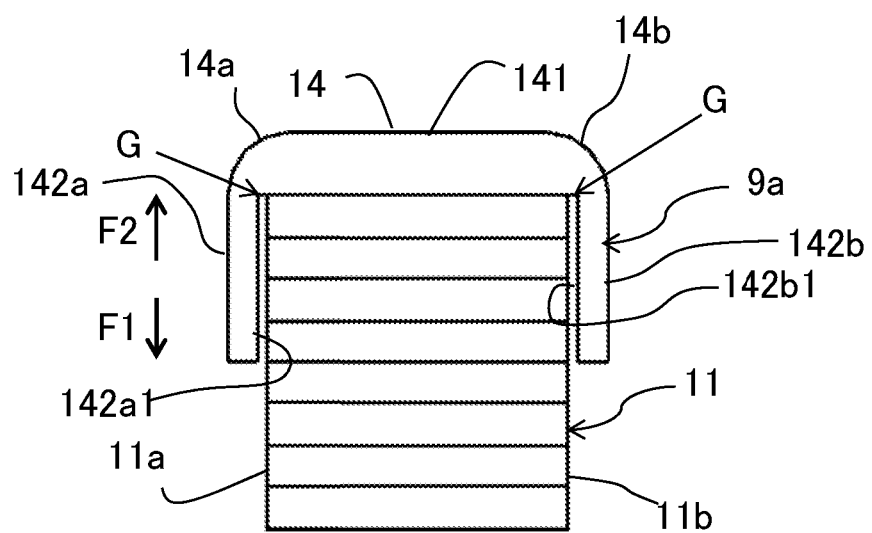
FIG. 15A is a cross-sectional view of the first insulating bobbin mounted on the stator core in the electric rotating machine according to Embodiment 1, when viewed in the direction of the arrow along the line X3-X3 in FIG. 9.
Figure 15B:
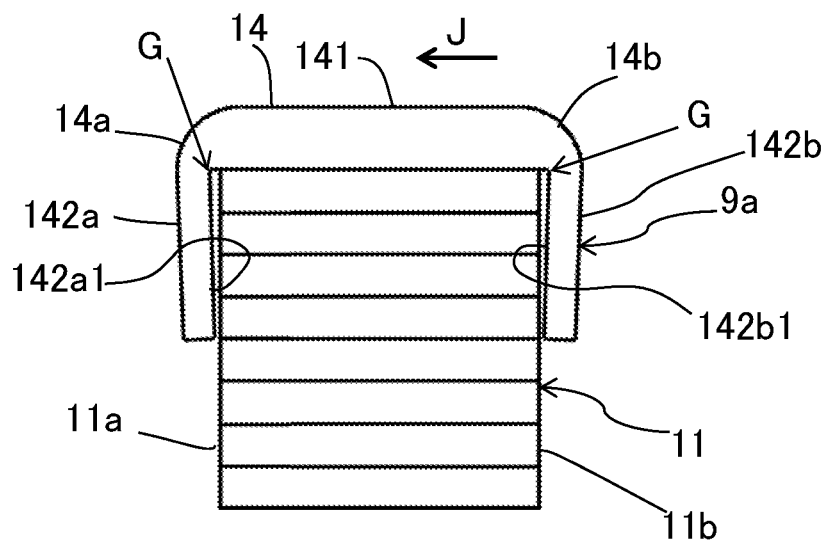
FIG. 15B is a cross-sectional view of the first insulating bobbin mounted on the stator core in the electric rotating machine according to Embodiment 1, when viewed in the direction of the arrow along the line X3-X3 in FIG. 9.

Heretofore, the respective electric rotating machines according to Comparative Examples 1 and 2 have been explained; the electric rotating machine according to Embodiment 1 can solve the foregoing problems in the respective electric rotating machines according to Comparative Examples 1 and 2. Each of FIGS. 15A and 15B is a cross-sectional view of the first insulating bobbin mounted on the stator core in the electric rotating machine according to Embodiment 1, when viewed in the direction of the arrow along the line X3-X3 in FIG. 9.

In contrast to the respective electric rotating machines according to Comparative Examples 1 and 2, in the electric rotating machine according to Embodiment 1, as illustrated in FIGS. 9, 10, 15A, and 15B, space portions, as clearances, are formed between the middle inner wall surface portions 142a1 and 142b1 of the first and second insulating bobbins 9a and 9b and the tooth side surface portions 11a and 11b, respectively; therefore, even when the stator coil 6 is wound around the tooth portion 11 through the intermediary of the first insulating bobbin 9a and the second insulating bobbin 9b, tensile stress is applied to neither the first insulating bobbin 9a nor the second insulating bobbin 9b.

Moreover, even in the case where when the stator coil 6 is wound, a circumferential direction load is applied to each of the tooth-side-surface facing portions 142a and 142b of the first insulating bobbin 9a and the second insulating bobbin 9b and hence the coil winding portion 14 collectively shifts in the circumferential direction with respect to the tooth portion 11, the inner-wall-surface convex portions 15a1 and 16a1 abut on the tooth side surface portion 11a and the inner-wall-surface convex portions 15b1 and 16b1 abut on the tooth side surface portion 11b; thus, because the respective circumferential-direction positions of the first insulating bobbin 9a and the second insulating bobbin 9b are restricted, the space between the middle inner wall surface portion 142a1 and the tooth side surface portion 11a and the space between the middle inner wall surface portion 142b1 and the tooth side surface portion 11b are securely maintained.

In general, a resin material is characterized in that the compressive strength thereof is larger than the tensile strength thereof; thus, when the insulating bobbin is configured in such a way that not tensile stress but compression stress is produced in the resin material, damage to the resin material, such as a crack, is not liable to occur. In the electric rotating machine according to Embodiment 1, when the first insulating bobbin 9a and the second insulating bobbin 9b formed of, for example, a resin material, are mounted on the stator core 5 and then the stator coil 6 is wound therearound, as described above, there is securely maintained respective spaces between the tooth side surface portions and the middle inner wall surface portions 142a1 and 142b1, located around the center of the coil winding portion 14 between the first flange portion 15 and the second flange portion 16, where the rigidity is low.

Accordingly, even in the case where when the stator coil 6 is wound, a circumferential-direction load is applied to each of the fillet surfaces 14a and 14b and the tooth-side-surface facing portions 142a and 142b of the tooth-endface facing portion 141, circumferential-direction displacement of the coil winding portion 14 is strongly restricted by the inner-wall-surface convex portions 15a1 and 15b1 arranged at the positions corresponding to the first flange portion 15 having a high rigidity and the inner-wall-surface convex portions 16a1 and 16b1 arranged at the positions corresponding to the second flange portion 16 having a high rigidity.

Therefore, because begins from the corner portions G, the front end sides of the tooth-side-surface facing portions 142a and 142b are bent in the direction not departing from but approaching the tooth side surface portions 11a and 11b, respectively, compression stress is applied to each of the corner portions G; thus, it is made possible to prevent a crack from occurring in the corner portion G of the coil winding portion 14 and hence the reliability of the insulation between the stator coil 6 and the stator core 5 can be raised.

In addition, in the electric rotating machine according to Embodiment 1, there has been explained the case where both the first insulating bobbin 9a and the second insulating bobbin 9b are configured in one and the same manner in order to prevent a crack from occurring; however, for example, in the case where there exists a difference between the probability of a crack occurring in the first insulating bobbin 9a and the probability of a crack occurring in the second insulating bobbin 9b, such as the case where the rigidities of the first insulating bobbin 9a and the second insulating bobbin 9b are different from each other or the stresses applied to the first insulating bobbin 9a and the second insulating bobbin 9b by the stator coil 6 are different from each other, or the case where one of the first insulating bobbin 9a and the second insulating bobbin 9b is configured in a manner different from that in which the other one thereof is configured so that the probability of crack occurrence is reduced, it may be allowed that the foregoing configuration is appropriately adopted only in the insulating bobbin having a relatively high probability of crack occurrence.

Embodiment 2

Figure 16:
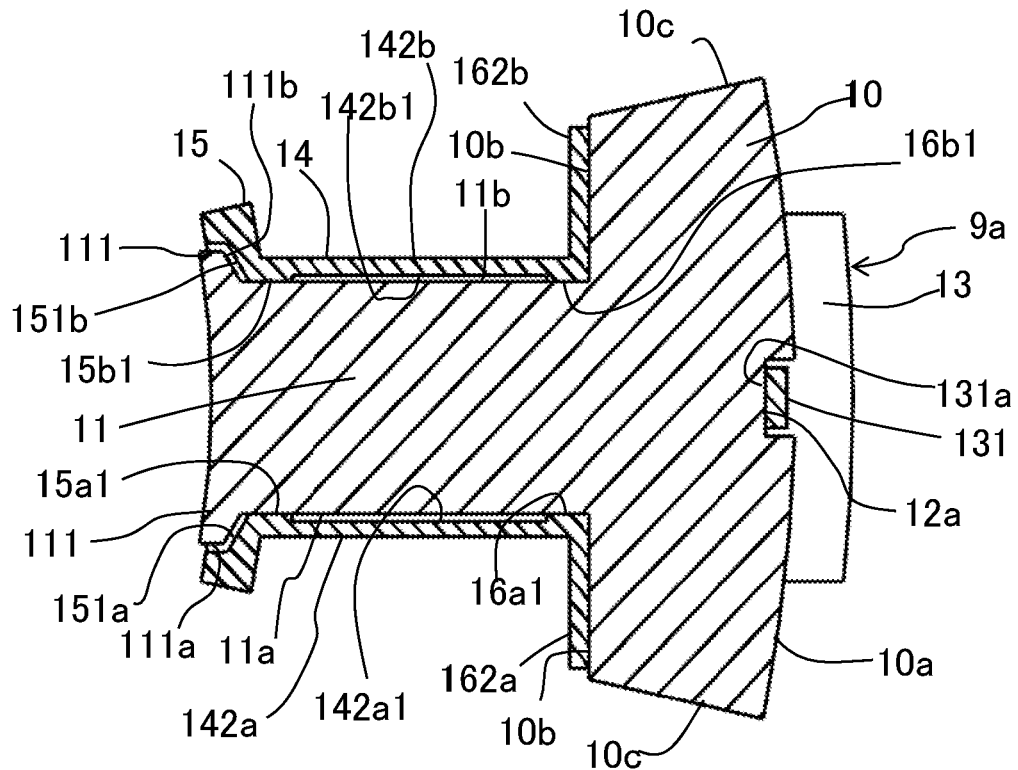
FIG. 16 is a cross-sectional view of a first insulating bobbin mounted on a stator core in an electric rotating machine according to Embodiment 2.

FIG. 16 is a cross-sectional view of a first insulating bobbin mounted on a stator core in an electric rotating machine according to according to Embodiment 2; the constituent elements the same as or similar to those of the electric rotating machine according to Embodiment 1 are designated by reference characters the same as those therein. In the explanation for the electric rotating machine according to Embodiment 2, only the portions that are different from those in the electric rotating machine according to Embodiment 1 will be described. As illustrated in FIG. 16, shoe portions 111 extending in the circumferential direction are provided at the radial-direction front end of the tooth portion 11.

In the inner surface portion of the first flange portion 15, the first insulating bobbin 9a has shoe-side-surface facing inner wall surface portions 151a and 151b facing, via a gap, shoe side-surface portions 111a and 111b, respectively, in the shoe portions 111. In addition, the inner-wall-surface convex portions 15a1 and 16a1 are provided adjacent to the middle inner wall surface portion 142a1; the inner-wall-surface convex portions 15b1 and 16b1 are provided adjacent to the middle inner wall surface portion 142b1.

The respective side-surface portions of the shoe portions 111 in the tooth portion 11 are apart from the shoe-side-surface facing inner wall surface portions 151a and 151b via a gap in the circumferential direction. When the first insulating bobbin 9a and the second insulating bobbin 9b are mounted on the stator core 5 and when the stator coil 6 is wound around the tooth portion 11 through the intermediary of the first insulating bobbin 9a and the second insulating bobbin 9b, the inner-wall-surface convex portions 15a1 and 16a1 abut on the tooth side surface portion 11a and the inner-wall-surface convex portions 15b1 and 16b1 abut on the tooth side surface portion 11b1; thus, there is kept the state where the respective side-surface portions of the shoe portions 111 in the tooth portion 11 are apart from the shoe-side-surface facing inner wall surface portions 151a and 151b. The configuration of the second insulating bobbin 9b (unillustrated) is the same as that of the first insulating bobbin 9a. The other configurations are the same as those of the electric rotating machine according to Embodiment 1.

The electric rotating machine according to Embodiment 2 has the shoe portions 111 in the tooth portion 11; because circumferential-direction spaces between the middle inner wall surface portions 142a1 and 142b1 and the tooth side surface portions 11a and 11b, respectively, are securely maintained, an effect the same as that of Embodiment 1 can be obtained.

Embodiment 3

Figure 17:
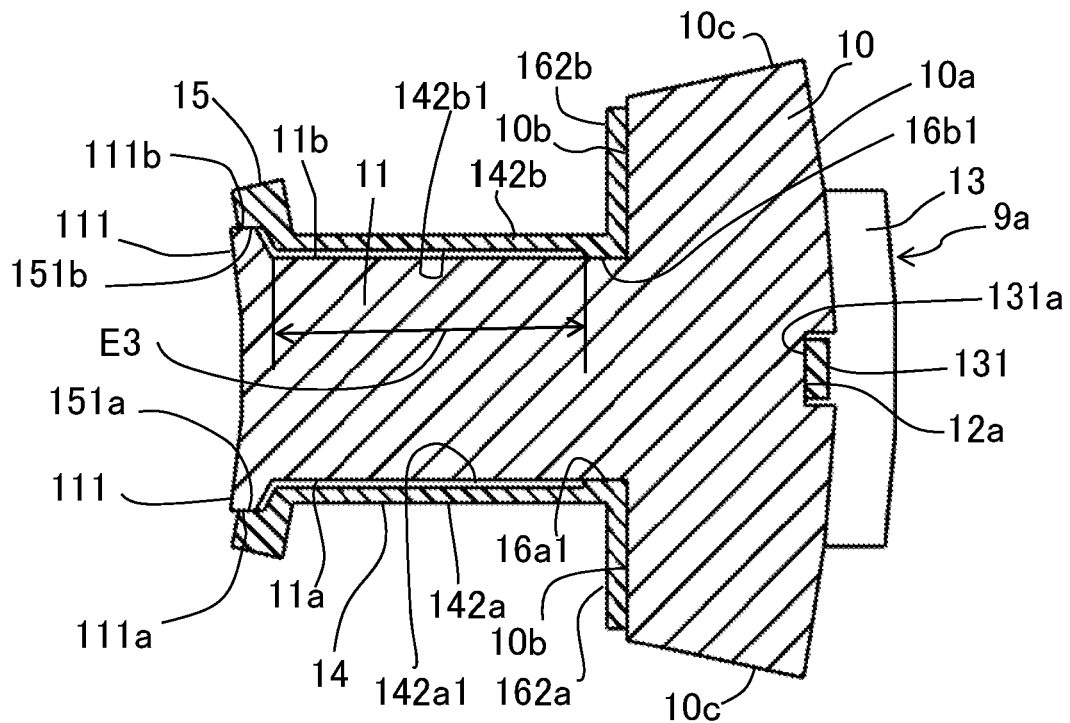
FIG. 17 is a cross-sectional view of a first insulating bobbin mounted on a stator core in an electric rotating machine according to Embodiment 3.

FIG. 17 is a cross-sectional view of a first insulating bobbin mounted on a stator core in an electric rotating machine according to according to Embodiment 3; the constituent elements the same as or similar to those of the electric rotating machine according to Embodiment 2 are designated by reference characters the same as those therein. In the explanation for the electric rotating machine according to Embodiment 3, only the portions that are different from those in the electric rotating machine according to Embodiment 2 will be described. As illustrated in FIG. 17, in the electric rotating machine according to Embodiment 3, the shoe portions 111 extending in the circumferential direction are provided at the radial-direction front end of the tooth portion 11, as is the case with the electric rotating machine according to Embodiment 2.

In the inner surface portion of the first flange portion 15, the first insulating bobbin 9a has shoe-side-surface facing inner wall surface portions 151a and 151b facing shoe side-surface portions 111a and 111b, respectively, in the shoe portions 111. Moreover, in the inner surface portions corresponding to the back-yoke-inner-circumference facing portions 162a and 162b, the inner-wall-surface convex portions 16a1 and 16b1 are provided adjacent to the middle inner wall surface portions 142a1 and 142b1, respectively. The configuration of the second insulating bobbin 9b (unillustrated) is the same as that of the first insulating bobbin 9a. The other configurations are the same as those of the electric rotating machine according to Embodiment 2.

The electric rotating machine according to Embodiment 3 is configured in such away that the shoe-side-surface facing inner wall surface portions 151a and 151b abut on the shoe side-surface portions 111a and 111b, respectively, and the inner-wall-surface convex portions 16a1 and 16b1 abut on the tooth side surface portions 11a and 11b, respectively, so that there are maintained spaces between the middle inner wall surface portions 142a1 and 142b1 in an area E3 and the tooth side surface portions 11a and 11b, respectively. Because this configuration makes it possible to securely maintain the spaces between the middle inner wall surface portions 142a1 and 142b1 and the tooth side surface portions 11a and 11b, respectively, even when the shoe portions 111 are provided in the tooth portion 11, an effect the same as that of Embodiment 1 can be obtained.

Embodiment 4

Figure 18:
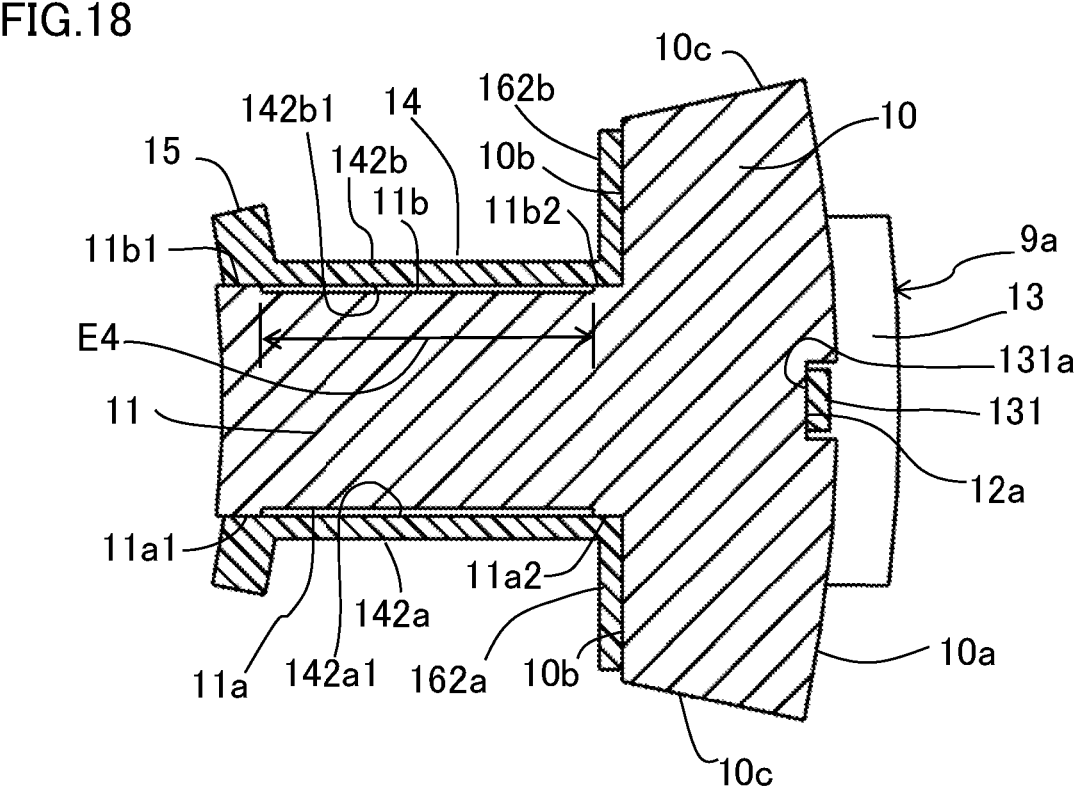
FIG. 18 is a cross-sectional view of a first insulating bobbin mounted on a stator core in an electric rotating machine according to Embodiment 4.

FIG. 18 is a cross-sectional view of a first insulating bobbin mounted on a stator core in an electric rotating machine according to according to Embodiment 4; the constituent elements the same as or similar to those of the electric rotating machine according to Embodiment 1 are designated by reference characters the same as those therein. In the explanation for the electric rotating machine according to Embodiment 4, only the portions that are different from those in the electric rotating machine according to Embodiment 1 will be described. In the electric rotating machine according to Embodiment 4, no inner-wall-surface convex portion is provided in each of the inner wall surfaces of the tooth-side-surface facing portions 142a and 142b of the first insulating bobbin 9a; tooth-side-surface convex portions 11a1 and 11b1 are provided at the inner radial sides of the tooth side surface portions 11a and 11b, respectively; tooth-side-surface convex portions 11a2 and 11b2 are provided at the outer radial sides of the tooth side surface portions 11a and 11b, respectively. The configuration of the second insulating bobbin 9b (unillustrated) is the same as that of the first insulating bobbin 9a. The other configurations are the same as those of the electric rotating machine according to Embodiment 1.

In the electric rotating machine according to Embodiment 4, spaces are formed between the tooth side surface portions 11a and 11b and the middle inner wall surface portions 142a1 and 142b1, respectively, in an area E4 between the tooth-side-surface convex portions 11a1 and 11b1 at the inner radial side of the tooth portion 11 and the tooth-side-surface convex portions 11a2 and 11b2 at the outer radial side of the tooth portion 11.

When the first insulating bobbin 9a and the second insulating bobbin 9b are mounted on the stator core 5 and when the stator coil 6 is wound around the tooth portion 11 through the intermediary of the first insulating bobbin 9a and the second insulating bobbin 9b, the tooth-side-surface convex portions 11a1, 11b1, 11a2, and 11b2 abut on the inner wall surface of the coil winding portion 14; thus, because there are securely maintained spaces between the tooth side surface portions 11a and 11b and the middle inner wall surface portions 142a1 and 142b1, respectively, an effect the same as that of Embodiment 1 can be obtained.

In addition, in the case where although not illustrated, shoe portions are provided at the front ends of the tooth portion 11, it may be allowed that as is the case with Embodiment 3, shoe-side-surface facing inner wall surface portions are provided in the inner wall portions of the first insulating bobbin and the second insulating bobbin so that the shoe-side-surface facing inner wall surface portions abut on the corresponding shoe side-surface portions. Moreover, it may also be allowed that instead of making the shoe-side-surface facing inner wall surface portion abut on the shoe side-surface portion, the tooth-side-surface convex portions and the inner wall surface of the coil winding portion are made to abut on each other so that spaces are maintained between the respective side surfaces of the shoe portion and the first and second insulating bobbins.

Embodiment 5

Figure 19:
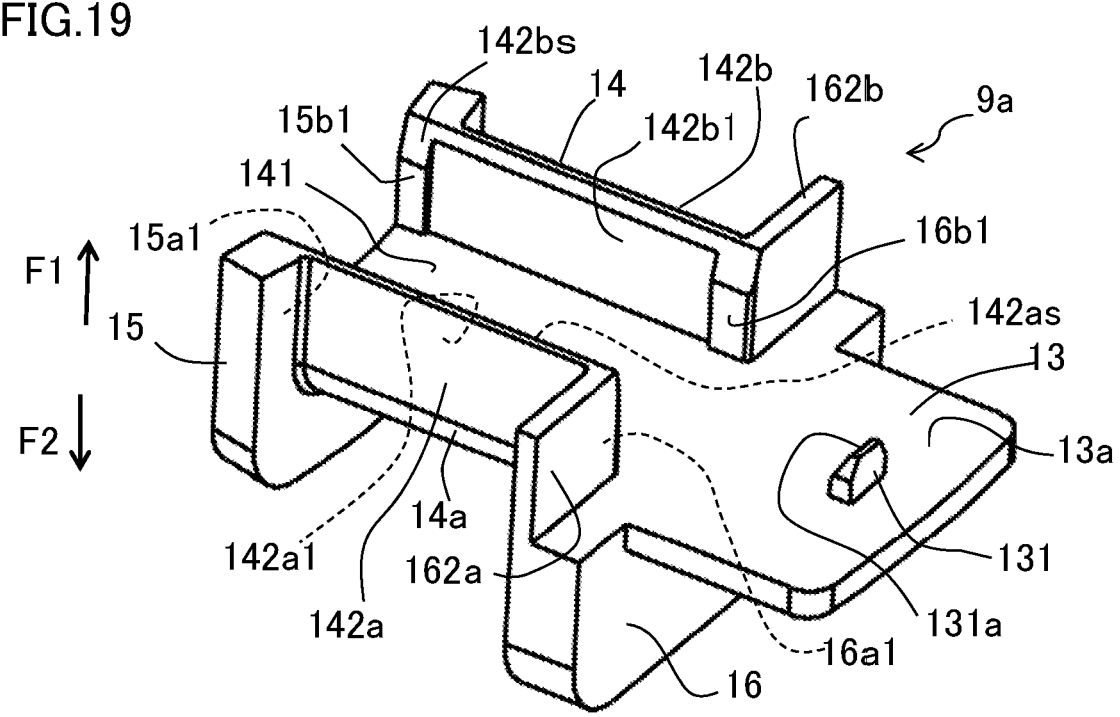
FIG. 19 is a perspective view of a first insulating bobbin in an electric rotating machine according to Embodiment 5.

FIG. 19 is a perspective view of a first insulating bobbin in an electric rotating machine according to Embodiment 5. The constituent elements the same as or similar to those of the electric rotating machine according to Embodiment 1 are designated by reference characters the same as those therein. In the explanation for the electric rotating machine according to Embodiment 5, only the portions that are different from those in the electric rotating machine according to Embodiment 1 will be described. In the electric rotating machine according to Embodiment 5, a slant surface 142as is provided at the front end sides, indicated by the arrow F1, of the inner-wall-surface convex portions 15a1 and 16a1 and the middle inner wall surface portion 142a1; a slant surface 142bs is provided at the front end sides, indicated by the arrow F1, of the inner-wall-surface convex portions 15b1 and 16b1 and the middle inner wall surface portion 142b1. The configuration of the second insulating bobbin 9b (unillustrated) is the same as that of the first insulating bobbin 9a. The other configurations are the same as those of the electric rotating machine according to Embodiment 1.

The electric rotating machine according to Embodiment 5 make it possible to obtain an effect the same as that of the electric rotating machine according to Embodiment 1; in addition to that, the first insulating bobbin 9a and the second insulating bobbin 9b can readily be fitted onto the tooth portion 11 of the stator core 5; thus, the mountability of the first and second insulating bobbins on the stator core 5 can be raised.

In FIG. 19, the slant surfaces 142as and 142bs are provided only at the front end side, indicated by the arrow F1, of the inside of the coil winding portion 14; however, it may be allowed that the respective slant surfaces gently change in the direction departing from the tooth side surface portions 11a and 11b from the root side indicated by the arrow F2.

Embodiment 6

Figure 20:
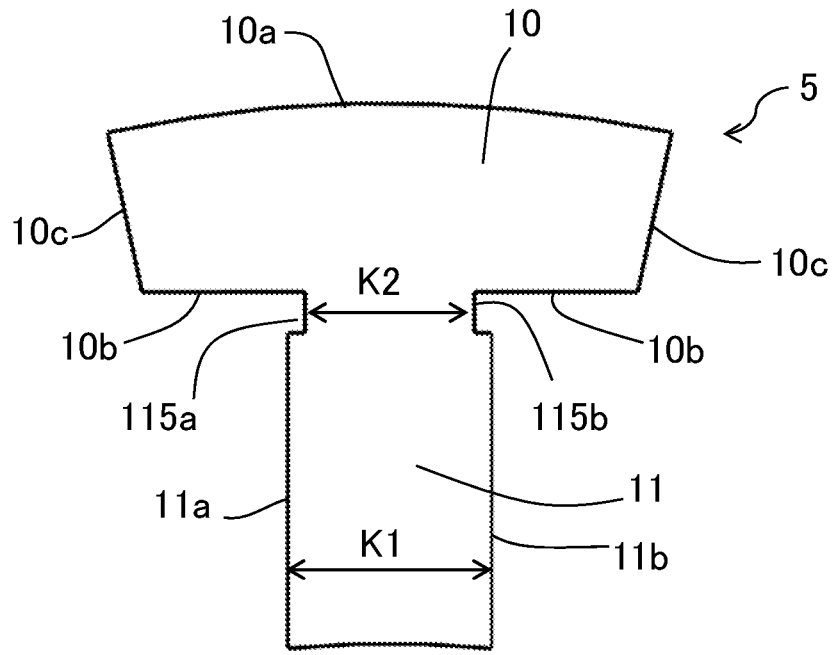
FIG. 20 is a top view of a stator core of an electric rotating machine according to Embodiment 6.
Figure 21:
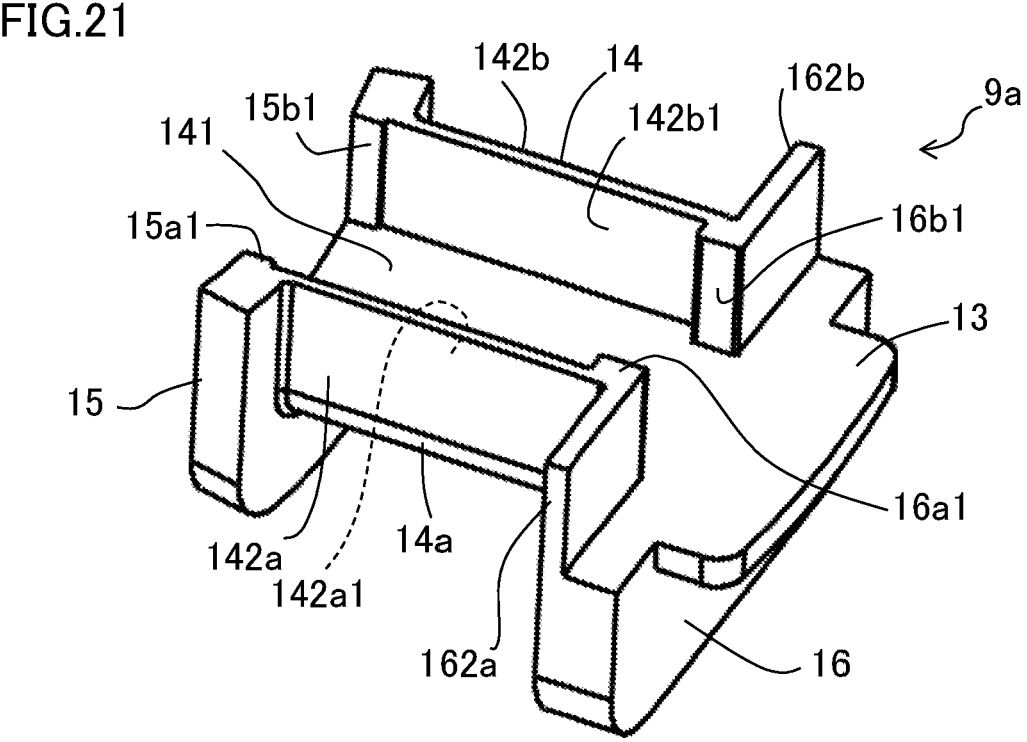
FIG. 21 is a perspective view of a first insulating bobbin in the electric rotating machine according to Embodiment 6.
Figure 22:
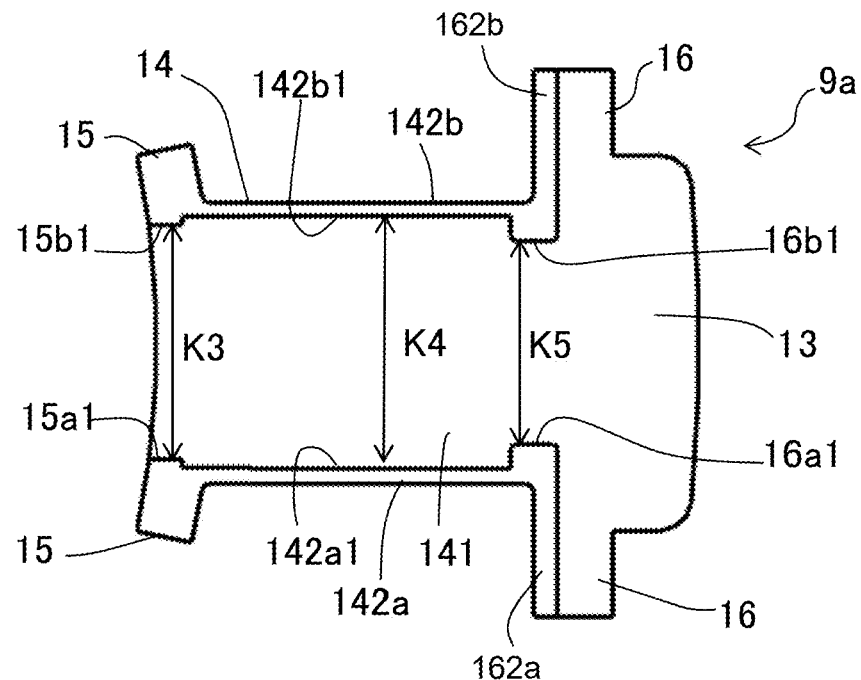
FIG. 22 is a plan view of the first insulating bobbin in the electric rotating machine according to Embodiment 6.
Figure 23:
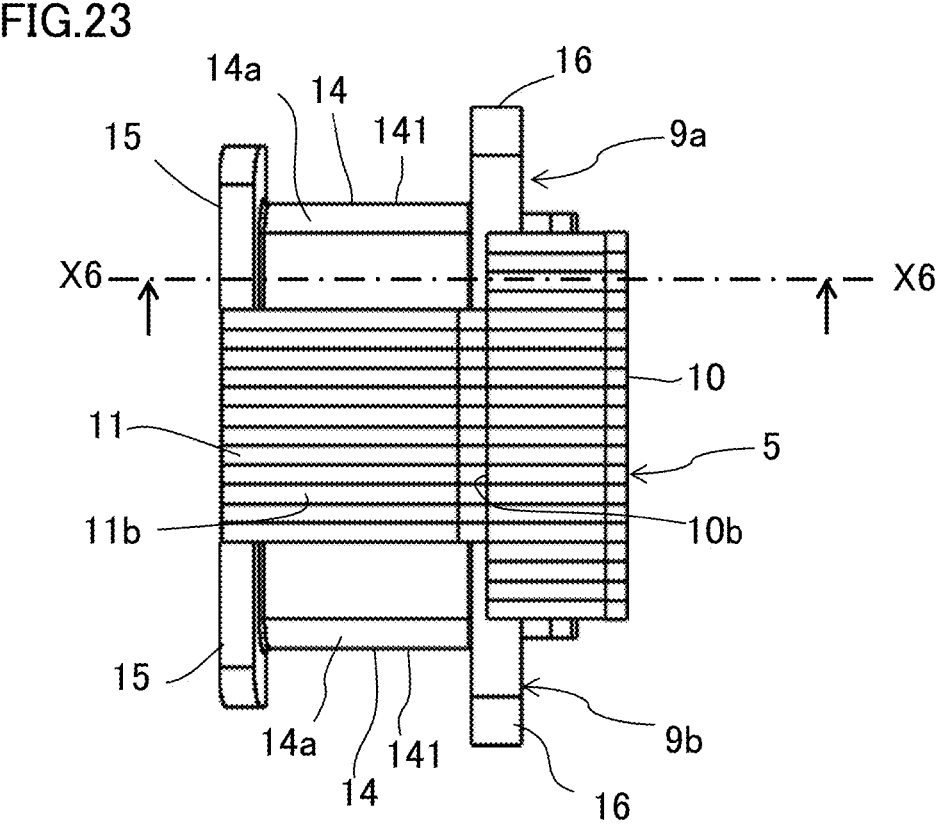
FIG. 23 is a side view illustrating the first insulating bobbin and a second insulating bobbin mounted on the stator core in the electric rotating machine according to Embodiment 6.
Figure 24:
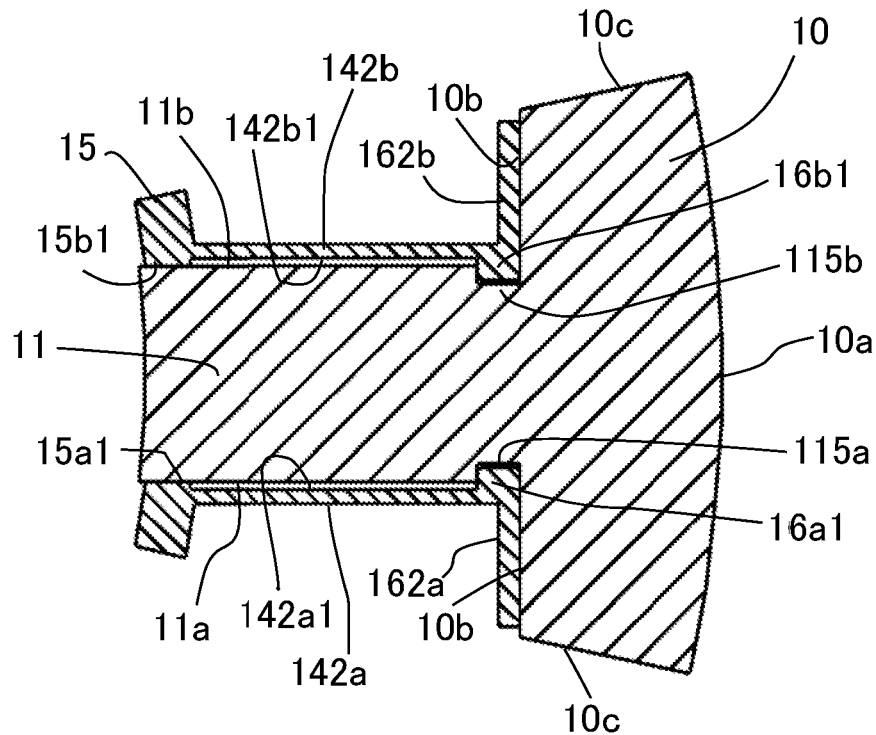
FIG. 24 is a cross-sectional view of the first insulating bobbin mounted on the stator core in the electric rotating machine according to Embodiment 6, when viewed in the direction of the arrow along the line X6-X6 in FIG. 23.

FIG. 20 is a top view of a stator core of an electric rotating machine according to Embodiment 6; FIG. 21 is a perspective view of a first insulating bobbin in the electric rotating machine according to Embodiment 6; FIG. 22 is a plan view of the first insulating bobbin in the electric rotating machine according to Embodiment 6; FIG. 23 is a side view illustrating the first insulating bobbin and a second insulating bobbin mounted on the stator core in the electric rotating machine according to Embodiment 6; FIG. 24 is a cross-sectional view of the first insulating bobbin mounted on the stator core in the electric rotating machine according to Embodiment 6, when viewed in the direction of the arrow along the line X6-X6 in FIG. 23. The constituent elements the same as or similar to those of the electric rotating machine according to Embodiment 1 are designated by reference characters the same as those therein. In the explanation for the electric rotating machine according to Embodiment 6, only the portions that are different from those in the electric rotating machine according to Embodiment 1 will be described.

As illustrated in FIG. 20, unlike Embodiment 1, the stator core 5 of the electric rotating machine according to Embodiment 6 does not have any back-yoke cutout portion 12 in the back-yoke outer circumferential portion 10a. In the stator core 5 according to Embodiment 6, a tooth cutout portion 115a is formed at the outer radial side of the tooth side surface portion 11a in such a way as to be adjacent to the back-yoke inner circumference portion 10b, and a tooth cutout portion 115b is formed at the outer radial side of the tooth side surface portion 11b in such a way as to be adjacent to the back-yoke inner circumference portion 10b. A width K2 [mm] between the tooth cutout portion 115a and the tooth cutout portion 115b and a circumferential-direction width K1 [mm] of the tooth portion 11 are in the relationship of [K1>K2].

As illustrated in FIGS. 21 and 22, the first insulating bobbin 9a in the electric rotating machine according to Embodiment 6 does not have the convex portion 131 that is provided in the back-yoke-endface facing portion 13 of the first insulating bobbin 9a in Embodiment 6. Inside the first insulating bobbin 9a in Embodiment 6, the inner-wall-surface convex portions 15a1 and 16a1 are provided adjacent to the middle inner wall surface portion 142a1, and the inner-wall-surface convex portions 15b1 and 16b1 are provided adjacent to the middle inner wall surface portion 142b1. The configuration of the second insulating bobbin 9b (unillustrated) is the same as that of the first insulating bobbin 9a.

A distance K3 [mm] between the inner-wall-surface convex portions 15a1 and 15b1, a distance K4 [mm] between the middle inner wall surface portions 142a1 and 142b1, and a distance K5 [mm] between the inner-wall-surface convex portions 16a1 and 16b1 are in the relationship of [K5<K3<K4]. In addition, with regard to the respective widths of the tooth portion 11 of the stator core 5 and the first insulating bobbin 9a, the relationships [K1 K3] and [K2≤K5] are established.

As illustrated in FIG. 23, the first insulating bobbin 9a and the second insulating bobbin 9b are mounted onto the stator core 5 from the stacking-direction both sides; at a time of the mounting thereof, as illustrated in FIG. 24, the inner-wall-surface convex portion 16a1 is press-fitted into the tooth cutout portion 115a and the inner-wall-surface convex portion 16b1 is press-fitted into the tooth cutout portion 115b, so that the first insulating bobbin 9a and the second insulating bobbin 9b are fixed to the stator core 5.

In the electric rotating machine according to Embodiment 6, as is the case with the electric rotating machine according to Embodiment 1, even when at a time of coil winding, the respective coil winding portions 14 of the first insulating bobbin 9a and the second insulating bobbin 9b are collectively shift in the circumferential direction, the inner-wall-surface convex portions 15a1 and 16a1 abut on the tooth side surface portion 11a and the inner-wall-surface convex portions 15b1 and 16b1 abut on the tooth side surface portion 11b, and hence respective circumferential-direction spaces are securely maintained; thus, an effect the same as that of Embodiment 1 can be obtained. Moreover, because the inner-wall-surface convex portion 16a1 is press-fitted into the tooth cutout portion 115a and the inner-wall-surface convex portion 16b1 is press-fitted into the tooth cutout portion 115b, the first insulating bobbin 9a and the second insulating bobbin 9b can more securely be fixed to the stator core 5.

Embodiment 7

Figure 25:
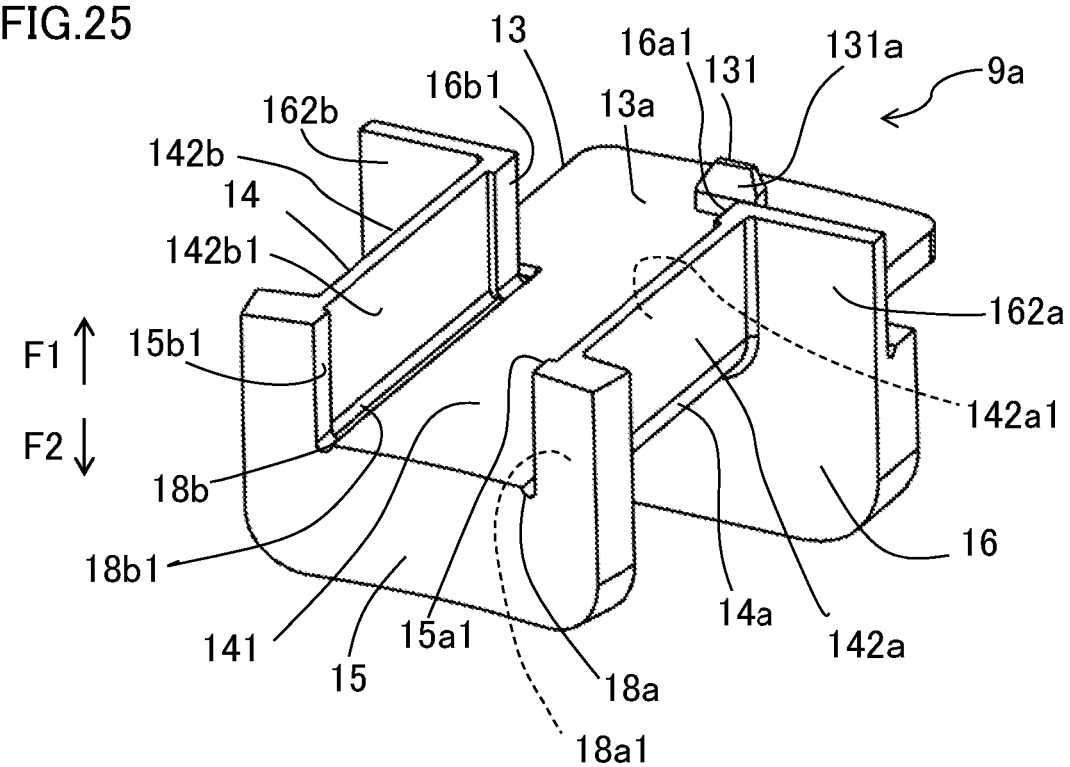
FIG. 25 is a perspective view of a first insulating bobbin in an electric rotating machine according to Embodiment 7.
Figure 26:
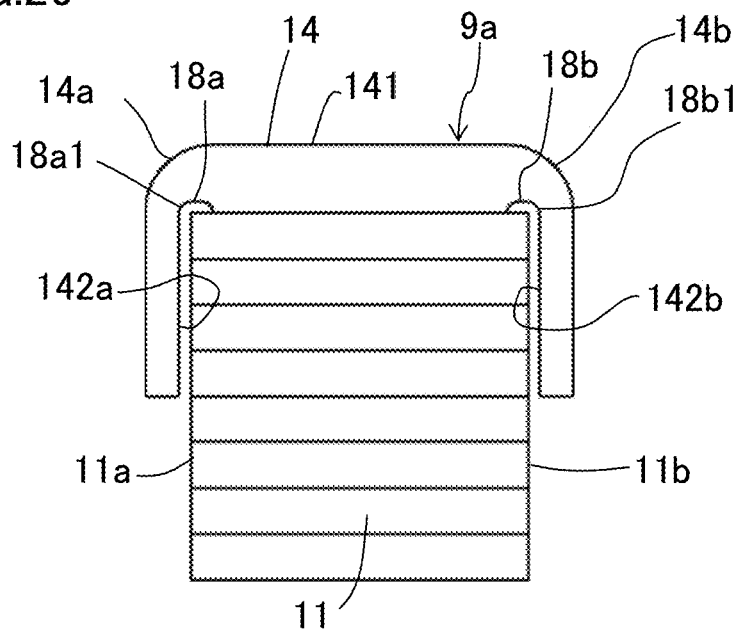
FIG. 26 is a cross-sectional view of the first insulating bobbin mounted on a stator core in the electric rotating machine according to Embodiment 7.

FIG. 25 is a perspective view of a first insulating bobbin in an electric rotating machine according to Embodiment 7; FIG. 26 is a cross-sectional view of the first insulating bobbin mounted on a stator core in the electric rotating machine according to according to Embodiment 7. The constituent elements the same as or similar to those of the electric rotating machine according to Embodiment 1 are designated by reference characters the same as those therein. In the explanation for the electric rotating machine according to Embodiment 5, only the portions that are different from those in the electric rotating machine according to Embodiment 1 will be described.

In FIG. 25, in the first insulating bobbin 9a, there are provided the inner-wall-surface convex portions 15a1 and 16a1 and an inner-wall-surface groove portion 18a having a fillet surface 18a1 at the root portion, indicated by the arrow F2, of the middle inner wall surface portion 142a1, and there are provided the inner-wall-surface convex portions 15b1 and 16b1 and an inner-wall-surface groove portion 18b having a fillet surface 18b1 at the root portion, indicated by the arrow F2, of the middle inner wall surface portion 142b1.

More specifically, as illustrated in FIG. 26, the inner-wall-surface groove portion 18a having the fillet surface 18a1 is formed at a position inside the first insulating bobbin 9a, at which the inner wall surface of the tooth-endface facing portion 141 and the inner wall surface, of the coil winding portion 14, that faces the tooth side surface portion 11a, intersect each other. In addition, the inner-wall-surface groove portion 18b having the fillet surface 18b1 is formed at a position inside the first insulating bobbin 9a, at which the inner wall surface, of the tooth-endface facing portion 141, that faces the tooth endface portion, and the inner wall surface, of the coil winding portion 14, that faces the tooth side surface portion 11b, intersect each other. The configuration of the second insulating bobbin 9b (unillustrated) is the same as that of the first insulating bobbin 9a.

The first insulating bobbin 9a prevents a crack in such a way that at a time of coil winding, the radial-direction front-end portions of the middle inner wall surface portions 142a1 and 142b1 are deformed in the direction approaching the tooth side surface portions 11a and 11b, respectively, so that the stress at the corner portion of the coil winding portion 14 is changed from tensile stress to compression stress; however, in order to raise the reliability, it is desirable that the compression stress is smaller. Because the stress concentration coefficient at the corner portion of the coil winding portion 14 is high, providing the fillet surfaces 14a and 14b makes it possible that the stress concentration coefficient is decreased and hence the stress is further reduced.

However, because in the case where only the fillet surfaces 14a and 14b are provided in the respective corner portions of the coil winding portion 14, the insides of the fillet surfaces 14a and 14b may make contact with the tooth side surface portions 11a and 11b, respectively, it is required to widen the distance between the middle inner wall surface portions 142a1 and 142b1; thus, the space between the adjacent stator coils 6 is narrowed.

Accordingly, in the electric rotating machine according to Embodiment 7, there are provided the inner-wall-surface convex portions 15a1 and 16a1 and the inner-wall-surface groove portion 18a having the fillet surface 18a1 at the root portion, indicated by the arrow F2, of the middle inner wall surface portion 142a1, and there are provided the inner-wall-surface convex portions 15b1 and 16b1 and the inner-wall-surface groove portion 18b having the fillet surface 18b1 at the root portion, indicated by the arrow F2, of the middle inner wall surface portion 142b1.

As a result, it is made possible that without increasing the distance between the middle inner wall surface portion 142a1 and 142b1, the inner wall surfaces of the fillet surfaces 14a and 14b are prevented from making contact with the tooth side surface portions 11a and 11b, respectively.

Embodiment 8

Figure 27:
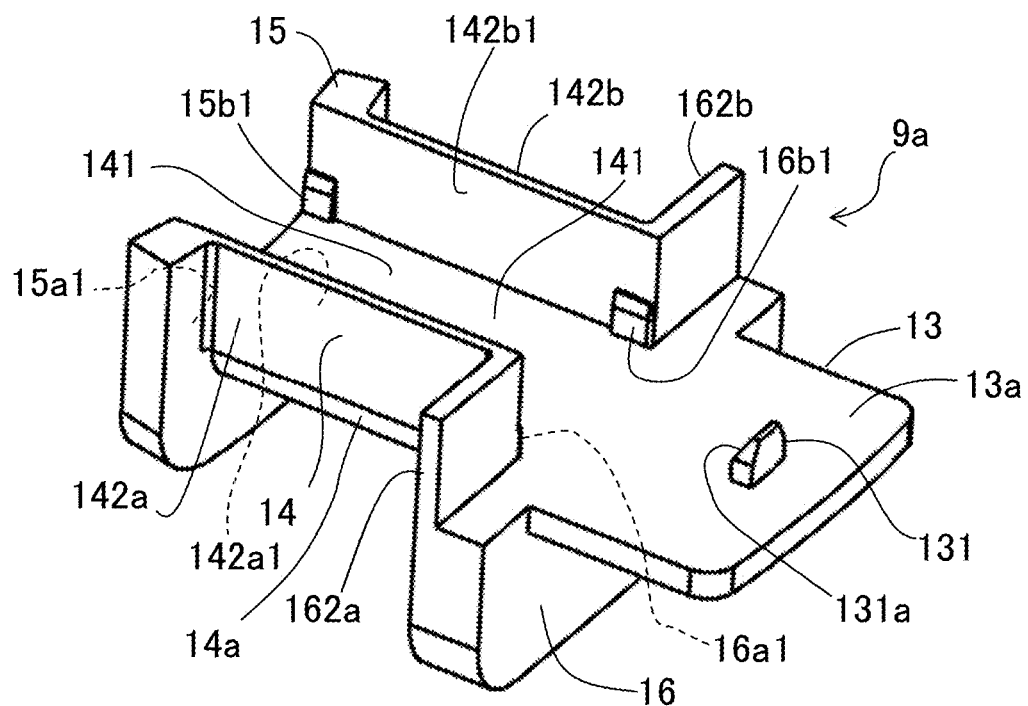
FIG. 27 is a perspective view of a first insulating bobbin in an electric rotating machine according to Embodiment 8.

FIG. 27 is a perspective view of a first insulating bobbin in an electric rotating machine according to Embodiment 8; the constituent elements the same as or similar to those of the electric rotating machine according to Embodiment 1 are designated by reference characters the same as those therein. In the explanation for the electric rotating machine according to Embodiment 8, only the portions that are different from those in the electric rotating machine according to Embodiment 1 will be described. As illustrated in FIG. 27, in the electric rotating machine according to Embodiment 8, the inner-wall-surface convex portions 15a1 and 16a1 are provided only at the root side of the middle inner wall surface portion 142a1 of the coil winding portion 14; the inner-wall-surface convex portions 15b1 and 16b1 are provided only at the root side of the middle inner wall surface portion 142b1 of the coil winding portion 14. The configuration of the second insulating bobbin 9b (unillustrated) is the same as that of the first insulating bobbin 9a. The other configurations are the same as those of the electric rotating machine according to Embodiment 1.

In the foregoing electric rotating machine according to each of the respective embodiments, when the stator coil is wound, the respective insides of the coil winding portions of the first insulating bobbin and the second insulating bobbin are made to abut on the corresponding tooth side surface portions in the abutting areas at the inner radial side and at the outer radial side, so that there is securely maintained a space between the tooth side surface portion and the middle area of the inner wall portion facing the tooth side surface portion of the coil winding portion; thus, because there is reduced tensile stress to be applied to the root portion of the middle area of the inner wall portion, facing the tooth side surface portion, of the coil winding portion, a crack in the insulating bobbin can be prevented and hence the insulation between the stator core and the stator coil can certainly be secured.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the present application. For example, there are included the case where at least one constituent element is modified, added, or omitted and the case where at least one constituent element is extracted and then combined with constituent elements of other embodiments.

Next, the respective features of the electric rotating machines disclosed in the present disclosure will be described as appendixes.

(Appendix 1) An electric rotating machine comprising:
a rotor fixed on a pivotably supported rotor shaft; and
a stator containing the rotor,
wherein the stator has a stator core and a stator coil mounted on the stator core through the intermediary of an insulating bobbin,
wherein the stator core has a ring-shaped back yoke portion and a tooth portion whose front-end portion protrudes from the back yoke portion toward the rotor shaft,
wherein the insulating bobbin includes a first insulating bobbin and a second insulating bobbin that are fitted onto both respective endfaces of the stator core in an axial direction of the electric rotating machine,
wherein at least one of the first insulating bobbin and the second insulating bobbin has a coil winding portion around which a conductor wire included in the stator coil is wound and whose cross section is U-shaped,
wherein the coil winding portion has a tooth-endface facing portion that faces an endface portion, in the axial direction, of the tooth portion and a tooth-side-surface facing portion that faces a tooth side surface portion, in a circumferential direction of the electric rotating machine, of the tooth portion, and
wherein the tooth-side-surface facing portion has a first abutting area that abuts on the tooth side surface portion, a second abutting area that abuts on the tooth side surface portion at a more outer side in a radial direction of the electric rotating machine than the first abutting area abuts thereon, and a middle inner wall surface portion that is situated between the first abutting area and the second abutting area and faces the tooth side surface portion via a space.

(Appendix 2) The electric rotating machine according to Appendix 1,
wherein the first abutting area is configured with a first inner-wall-surface convex portion formed adjacent to an inner side, in the radial direction, of the middle inner wall surface portion, and
wherein the second abutting area is configured with a second inner-wall-surface convex portion formed adjacent to an outer side, in the radial direction, of the middle inner wall surface portion.

(Appendix 3) The electric rotating machine according to Appendix 1,
wherein the first abutting area abuts on a first tooth-side-surface convex portion formed in the tooth side surface portion, and
wherein the second abutting area abuts on a second tooth-side-surface convex portion that is formed in the tooth side surface portion at more outer side in the radial direction than the first tooth-side-surface convex portion.

(Appendix 4) The electric rotating machine according to any one of Appendix 1 and Appendix 2,
wherein at the front-end portion of the tooth portion, the stator core has a shoe portion that extends in the circumferential direction of the electric rotating machine from the tooth side surface portion, and
wherein the tooth-side-surface facing portion has a shoe-side-surface facing inner wall surface portion that faces, via a space, the shoe side-surface portion, in the circumferential direction, of the shoe portion.

(Appendix 5) The electric rotating machine according to any one of Appendix 1 through Appendix 4, wherein at least one of the first insulating bobbin and the second insulating bobbin has a slant surface that is situated at the front-end portion, in the circumferential direction, of the tooth-side-surface facing portion and slants in a direction departing from the tooth side surface portion.

(Appendix 6) The electric rotating machine according to any one of Appendix 1 through Appendix 5, wherein at least one of the first insulating bobbin and the second insulating bobbin is mounted in such a way that a gap exists between each of the first abutting area and the second abutting area and the tooth side surface portion.

(Appendix 7) The electric rotating machine according to Appendix 2,
wherein the tooth portion has a tooth cutout portion that is situated at an outer side, in the radial direction, of the tooth side surface portion and makes contact with an inner circumference portion of the back yoke portion, and
wherein the second inner-wall-surface convex portion is press-fitted into the tooth cutout portion.

(Appendix 8) The electric rotating machine according to Appendix 2, wherein each of the first inner-wall-surface convex portion and the second inner-wall-surface convex portion is formed in an area from a root side of the tooth-side-surface facing portion to a front end side thereof.

(Appendix 9) The electric rotating machine according to Appendix 2, wherein each of the first inner-wall-surface convex portion and the second inner-wall-surface convex portion is formed only at a root side of the tooth-side-surface facing portion.

(Appendix 10) The electric rotating machine according to any one of Appendix 1 through Appendix 9, further comprising an inner-wall-surface groove portion having a fillet surface, at a root side of the tooth-side-surface facing portion.

(Appendix 11) An electric rotating machine comprising:
a rotor fixed on a pivotably supported rotor shaft; and
a stator containing the rotor,
wherein the stator has a stator core and a stator coil mounted on the stator core through the intermediary of an insulating bobbin,
wherein the stator core has a ring-shaped back yoke portion and a tooth portion whose front-end portion protrudes from the back yoke portion toward the rotor shaft,
wherein at the front-end portion of the tooth portion, the stator core has a shoe portion that extends in the circumferential direction of the electric rotating machine from the tooth side surface portion in the circumferential direction of the electric rotating machine,
wherein the insulating bobbin includes a first insulating bobbin and a second insulating bobbin that are fitted onto both respective endfaces of the stator core in an axial direction of the electric rotating machine,
wherein at least one of the first insulating bobbin and the second insulating bobbin has a coil winding portion around which a conductor wire included in the stator coil is wound and whose cross section is U-shaped,
wherein the coil winding portion has a tooth-endface facing portion that faces an endface portion, in the axial direction, of the tooth portion, a tooth-side-surface facing portion that faces a tooth side surface portion, and a shoe-side-surface facing inner wall surface portion that faces a shoe side-surface portion, in the circumferential direction, of the shoe portion,
where the shoe-side-surface facing inner wall surface portion has a first abutting area that abuts on the shoe side-surface portion, and
wherein the tooth-side-surface facing portion has a second abutting area that abuts on the tooth side surface portion and a middle inner wall surface portion that is situated between the first abutting area and the second abutting area and faces the tooth side surface portion via a space.

(Appendix 12) The electric rotating machine according to any one of Appendix 1 through Appendix 11,
wherein the back yoke portion of the stator core has a back-yoke cutout portion in a back-yoke outer circumferential portion thereof,
wherein each of the first insulating bobbin and the second insulating bobbin has a back-yoke-endface facing portion that faces an endface of the back yoke portion of the stator core,
wherein the back-yoke-endface facing portion has a convex portion that protrudes toward the endface of the back yoke portion, and
wherein the convex portion protruding toward the endface of the back yoke portion is press-fitted into the back-yoke cutout portion in the back-yoke outer circumferential portion, so that each of the first insulating bobbin and the second insulating bobbin is fixed to the stator core.

What is claimed is:

1. An electric rotating machine comprising:
a rotor fixed on a pivotably supported rotor shaft; and
a stator containing the rotor,
wherein the stator has a stator core and a stator coil mounted on the stator core through the intermediary of an insulating bobbin,
wherein the stator core has a ring-shaped back yoke portion and a tooth portion whose front-end portion protrudes from the back yoke portion toward the rotor shaft,
wherein the insulating bobbin includes a first insulating bobbin and a second insulating bobbin that are fitted onto both respective endfaces of the stator core in an axial direction of the electric rotating machine,
wherein at least one of the first insulating bobbin and the second insulating bobbin has a coil winding portion around which a conductor wire included in the stator coil is wound and whose cross section is U-shaped,
wherein the coil winding portion has a tooth-endface facing portion that faces an endface portion, in the axial direction, of the tooth portion and a tooth-side-surface facing portion that faces a tooth side surface portion, in a circumferential direction of the electric rotating machine, of the tooth portion,
wherein the tooth-side-surface facing portion has a first abutting area that abuts on the tooth side surface portion, a second abutting area that abuts on the tooth side surface portion at a more outer side in a radial direction of the electric rotating machine than the first abutting area abuts thereon, and a middle inner wall surface portion that is situated between the first abutting area and the second abutting area and faces the tooth side surface portion via a space, and
wherein the first abutting area is located at an uppermost side of the tooth side surface portion and the second abutting surface is located at a lowermost side of the tooth side surface portion in a radial direction.

2. The electric rotating machine according to claim 1,
wherein the first abutting area is configured with a first inner-wall-surface convex portion formed adjacent to an inner side, in the radial direction, of the middle inner wall surface portion, and
wherein the second abutting area is configured with a second inner-wall-surface convex portion formed adjacent to an outer side, in the radial direction, of the middle inner wall surface portion.

3. The electric rotating machine according to claim 2,
wherein at the front-end portion of the tooth portion, the stator core has a shoe portion that extends in the circumferential direction of the electric rotating machine from the tooth side surface portion, and
wherein the tooth-side-surface facing portion has a shoe-side-surface facing inner wall surface portion that faces, via a space, the shoe side-surface portion, in the circumferential direction, of the shoe portion.

4. The electric rotating machine according to claim 2, wherein at least one of the first insulating bobbin and the second insulating bobbin has a slant surface that is situated at the front-end portion, in the circumferential direction, of the tooth-side-surface facing portion and slants in a direction departing from the tooth side surface portion.

5. The electric rotating machine according to claim 2, wherein at least one of the first insulating bobbin and the second insulating bobbin is mounted in such a way that a gap exists between each of the first abutting area and the second abutting area and the tooth side surface portion.

6. The electric rotating machine according to claim 2,
wherein the tooth portion has a tooth cutout portion that is situated at an outer side, in the radial direction, of the tooth side surface portion and makes contact with an inner circumference portion of the back yoke portion, and
wherein the second inner-wall-surface convex portion is press-fitted into the tooth cutout portion.

7. The electric rotating machine according to claim 2, wherein each of the first inner-wall-surface convex portion and the second inner-wall-surface convex portion is formed in an area from a root side of the tooth-side-surface facing portion to a front end side thereof.

8. The electric rotating machine according to claim 2, wherein each of the first inner-wall-surface convex portion and the second inner-wall-surface convex portion is formed only at a root side of the tooth-side-surface facing portion.

9. The electric rotating machine according to claim 2, further comprising an inner-wall-surface groove portion having a fillet surface, at a root side of the tooth-side-surface facing portion.

10. The electric rotating machine according to claim 1,
wherein the first abutting area abuts on a first tooth-side-surface convex portion formed in the tooth side surface portion, and
wherein the second abutting area abuts on a second tooth-side-surface convex portion that is formed in the tooth side surface portion at more outer side in the radial direction than the first tooth-side-surface convex portion.

11. The electric rotating machine according to claim 1,
wherein at the front-end portion of the tooth portion, the stator core has a shoe portion that extends in the circumferential direction of the electric rotating machine from the tooth side surface portion, and
wherein the tooth-side-surface facing portion has a shoe-side-surface facing inner wall surface portion that faces, via a space, the shoe side-surface portion, in the circumferential direction, of the shoe portion.

12. The electric rotating machine according to claim 1, wherein at least one of the first insulating bobbin and the second insulating bobbin has a slant surface that is situated at the front-end portion, in the circumferential direction, of the tooth-side-surface facing portion and slants in a direction departing from the tooth side surface portion.

13. The electric rotating machine according to claim 1, wherein at least one of the first insulating bobbin and the second insulating bobbin is mounted in such a way that a gap exists between each of the first abutting area and the second abutting area and the tooth side surface portion.

14. The electric rotating machine according to claim 1, further comprising an inner-wall-surface groove portion having a fillet surface, at a root side of the tooth-side-surface facing portion.

15. The electric rotating machine according to claim 1,
wherein the back yoke portion of the stator core has a cutout portion in a back-yoke outer circumferential portion thereof,
wherein each of the first insulating bobbin and the second insulating bobbin has a back-yoke-endface facing portion that faces an endface of the back yoke portion of the stator core,
wherein the back-yoke-endface facing portion has a convex portion that protrudes toward the endface of the back yoke portion, and
wherein the convex portion protruding toward the endface of the back yoke portion is press-fitted into the cutout portion in the back-yoke outer circumferential portion, so that each of the first insulating bobbin and the second insulating bobbin is fixed to the stator core.

16. An electric rotating machine comprising:
a rotor fixed on a pivotably supported rotor shaft; and
a stator containing the rotor,
wherein the stator has a stator core and a stator coil mounted on the stator core through the intermediary of an insulating bobbin,
wherein the stator core has a ring-shaped back yoke portion and a tooth portion whose front-end portion protrudes from the back yoke portion toward the rotor shaft,
wherein at the front-end portion of the tooth portion, the stator core has a shoe portion that extends in the circumferential direction of the electric rotating machine from a tooth side surface portion in the circumferential direction of the electric rotating machine,
wherein the insulating bobbin includes a first insulating bobbin and a second insulating bobbin that are fitted onto both respective endfaces of the stator core in an axial direction of the electric rotating machine,
wherein at least one of the first insulating bobbin and the second insulating bobbin has a coil winding portion around which a conductor wire included in the stator coil is wound and whose cross section is U-shaped,
wherein the coil winding portion has a tooth-endface facing portion that faces an endface portion, in the axial direction, of the tooth portion, a tooth-side-surface facing portion that faces a tooth side surface portion, and a shoe-side-surface facing inner wall surface portion that faces a shoe side-surface portion, in the circumferential direction, of the shoe portion,
where the shoe-side-surface facing inner wall surface portion has a first abutting area that abuts on the shoe side-surface portion, and
wherein the tooth-side-surface facing portion has a second abutting area that abuts on the tooth side surface portion and a middle inner wall surface portion that is situated between the first abutting area and the second abutting area and faces the tooth side surface portion via a space, the middle wall surface portion extending along the tooth-side-surface portion at a midpoint of the tooth-side surface portion between the first abutting area and the second abutting area.

17. The electric rotating machine according to claim 16,
wherein the back yoke portion of the stator core has a cutout portion in a back-yoke outer circumferential portion thereof,
wherein each of the first insulating bobbin and the second insulating bobbin has a back-yoke-endface facing portion that faces an endface of the back yoke portion of the stator core,
wherein the back-yoke-endface facing portion has a convex portion that protrudes toward the endface of the back yoke portion, and
wherein the convex portion protruding toward the endface of the back yoke portion is press-fitted into the cutout portion in the back-yoke outer circumferential portion, so that each of the first insulating bobbin and the second insulating bobbin is fixed to the stator core.

* * * * *